US011952235B2

(12) United States Patent
Hamabata et al.

(10) Patent No.: US 11,952,235 B2

(45) Date of Patent: Apr. 9, 2024

(54) IMAGE FORMING SYSTEM AND CHARGE ELIMINATING APPARATUS

(71) Applicant: FUJIFILM Business Innovation Corp., Tokyo (JP)

(72) Inventors: Naoto Hamabata, Yokohama (JP); Katsumi Tanaka, Yokohama (JP); Tomokazu Kurita, Yokohama (JP); Kiyotoshi Kaneyama, Ebina (JP); Taro Mitsui, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 101 days.

(21) Appl. No.: 17/405,078

(22) Filed: Aug. 18, 2021

(65) Prior Publication Data

US 2022/0324672 A1 Oct. 13, 2022

(30) Foreign Application Priority Data

Apr. 9, 2021 (JP) ................................ 2021-066480
Apr. 9, 2021 (JP) ................................ 2021-066481

(51) Int. Cl.

*B65H 37/00* (2006.01)
*B65H 29/14* (2006.01)
*G03G 15/00* (2006.01)

(52) U.S. Cl.

CPC ............ *B65H 37/00* (2013.01); *B65H 29/14* (2013.01); *G03G 15/6573* (2013.01);

(Continued)

(58) Field of Classification Search

CPC ..... G03G 2221/00; G03G 2215/00649; G03G 15/6573; G03G 15/6582; G03G 15/6576; G03G 2215/00654; G03G 15/6552; B65H 29/14; B65H 37/00; B65H 2301/5133; B65H 2402/10

See application file for complete search history.

(56) References Cited

U.S. PATENT DOCUMENTS 5,589,925 A * 12/1996 Cahill ................ G03G 15/2028 399/323
6,339,685 B1 * 1/2002 Okamoto ........... H04N 1/00771 399/407

(Continued)

FOREIGN PATENT DOCUMENTS

JP 2019-167169 A 10/2019

*Primary Examiner* — Jennifer Bahls

(74) *Attorney, Agent, or Firm* — Oliff PLC

(57) ABSTRACT

An image forming system includes: an image forming apparatus configured to form an image on a recording medium; a post-processing apparatus configured to perform post-processing on the recording medium on which an image is formed by the image forming apparatus; a relay apparatus having a function of changing a transport speed of the recording medium on which an image is formed by the image forming apparatus to a transport speed of the post-processing apparatus and transporting the recording medium to a subsequent stage; and a charge eliminating apparatus configured to perform charge elimination on the recording medium that is charged, by reducing a charge amount of the charged recording medium, and the charge eliminating apparatus is provided at a stage that is after the relay apparatus and before the post-processing apparatus.

19 Claims, 21 Drawing Sheets

(52) U.S. Cl.
CPC ..... *G03G 15/6576* (2013.01); *G03G 15/6582* (2013.01); *G03G 2221/00* (2013.01)

(56) References Cited

U.S. PATENT DOCUMENTS

| | | | | |
|---|---|---|---|---|
| 2004/0178573 | A1 * | 9/2004 | Hasegawa | B65H 29/54<br>271/307 |
| 2006/0191426 | A1 * | 8/2006 | Timmerman | B26F 1/384<br>101/24 |
| 2012/0045265 | A1 * | 2/2012 | Zaretsky | G03G 15/6573<br>399/405 |
| 2014/0015189 | A1 * | 1/2014 | Minamisawa | B65H 43/02<br>271/3.18 |
| 2015/0043955 | A1 * | 2/2015 | Nishizawa | G03G 15/6582<br>399/407 |
| 2016/0130101 | A1 * | 5/2016 | Hachisuga | H04N 1/00602<br>271/3.2 |
| 2017/0139367 | A1 * | 5/2017 | Adachi | G03G 15/6582 |
| 2020/0071105 | A1 * | 3/2020 | Okada | B65H 9/20 |

* cited by examiner

APPARATUS LAYOUT OF ANOTHER IMAGE FORMING SYSTEM

APPARATUS LAYOUT EXAMPLE OF ANOTHER IMAGE FORMING SYSTEM

APPARATUS LAYOUT EXAMPLE OF ANOTHER IMAGE FORMING SYSTEM

CASE 1: PEELING MEMBER 63 PROVIDED

CASE 2: PEELING MEMBER 63 PROVIDED

IMAGE FORMING SYSTEM AND CHARGE ELIMINATING APPARATUS

CROSS-REFERENCE TO RELATED APPLICATIONS

This application is based on and claims priority under 35 USC 119 from Japanese Patent Application No. 2021-066480 filed on Apr. 9, 2021 and Japanese Patent Application No. 2021-066481 filed on Apr. 9, 2021.

BACKGROUND

1. Technical Field

The present disclosure relates to an image forming system and a charge elimination apparatus.

2. Related Art

JP-A-2019-167169 discloses a charge eliminating apparatus including, as charge eliminating units that eliminate charge from a high-resistance charged medium, a first contact charge eliminating unit that eliminates a majority of electric charge charged on the charged medium, the first contact charge eliminating unit including a charge eliminating member that comes into contact with the transported charged medium, and a second non-contact charge eliminating unit that eliminates residual electric charge of the charged medium in a non-contact state after the charge elimination by the first contact charge eliminating apparatus, the second non-contact charge eliminating unit being provided downstream of the first contact charge eliminating unit in the transport direction of the charged medium.

SUMMARY

Aspects of non-limiting embodiments of the present disclosure relate to providing an image forming system that can uniformly perform charge elimination on a recording medium when there is a difference between a transport speed of the recording medium in an image forming apparatus and a transport speed of the recording medium in a post-processing apparatus, as compared with a case where the transport speed changes in the middle of charge elimination by a charge eliminating apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming system including: an image forming apparatus configured to form an image on a recording medium; a post-processing apparatus configured to perform post-processing on the recording medium on which an image is formed by the image forming apparatus; a relay apparatus having a function of changing a transport speed of the recording medium on which an image is formed by the image forming apparatus to a transport speed of the post-processing apparatus and transporting the recording medium to a subsequent stage; and a charge eliminating apparatus configured to perform charge elimination on the recording medium that is charged, by reducing a charge amount of the charged recording medium, wherein the charge eliminating apparatus is provided at a stage that is after the relay apparatus and before the post-processing apparatus.

BRIEF DESCRIPTION OF THE DRAWINGS

Exemplary embodiement(s) of the present invention will be described in detail based on the following figures, wherein.

DETAILED DESCRIPTION

Next, an exemplary embodiment of the present disclosure will be described in detail with reference to the drawings.

Figure 1:
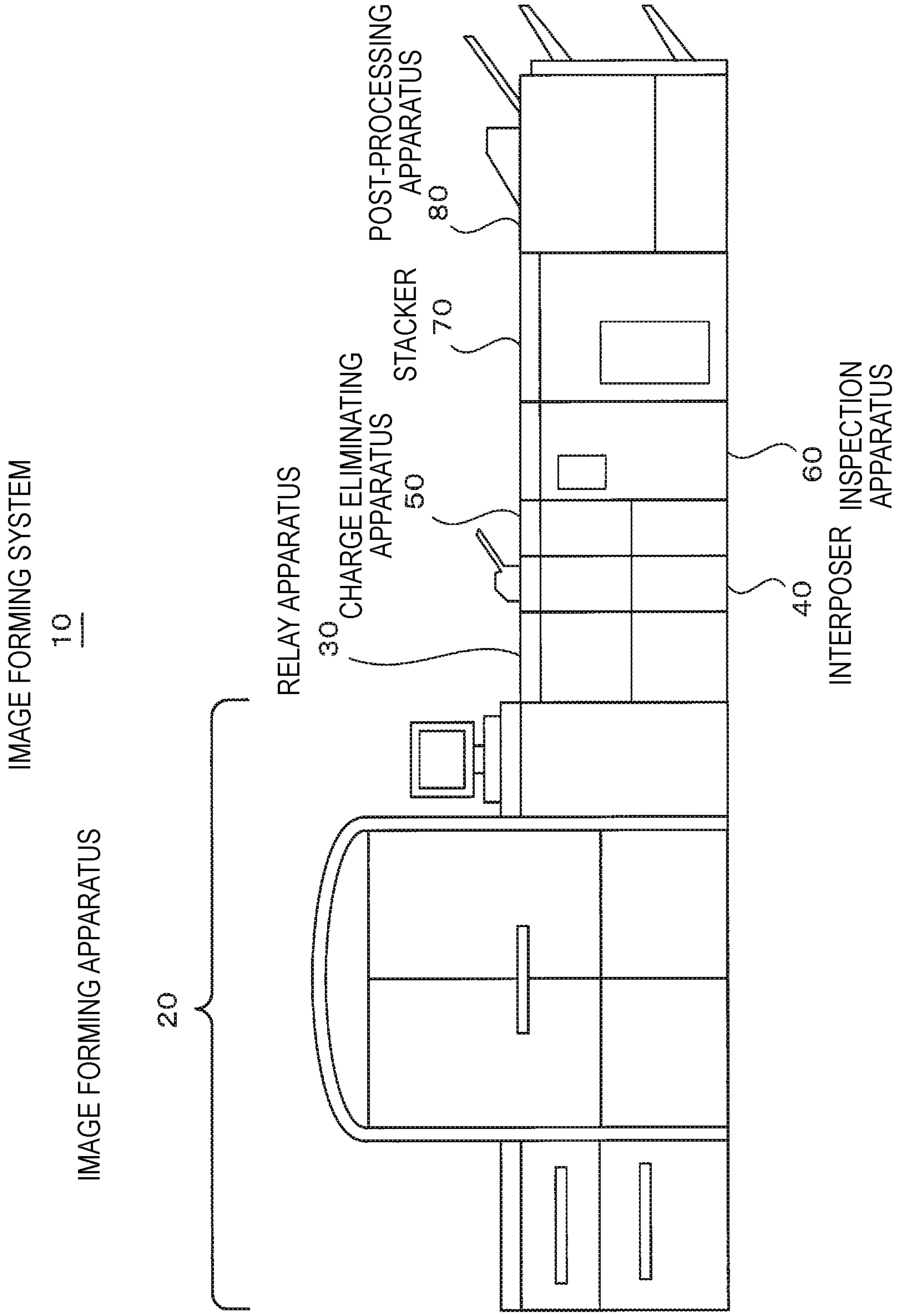
FIG. 1 illustrates a configuration of an image forming system 10 according to an exemplary embodiment of the present disclosure.

FIG. 1 illustrates a system configuration of an image forming system 10 according to the exemplary embodiment of the present disclosure.

As illustrated in FIG. 1, the image forming system 10 according to the exemplary embodiment of the present disclosure includes an image forming apparatus 20, a relay apparatus 30, an interposer 40, a charge eliminating apparatus 50, an inspection apparatus 60, a stacker 70, and a post-processing apparatus 80.

The image forming apparatus 20 has a function of accommodating a recording medium such as a printing sheet and forming an image on the accommodated printing sheet. The recording medium includes not only a printing sheet but also a film on which an image can be printed. In the following description, the printing sheet (hereinafter, abbreviated as a sheet) will be described as the recording medium.

The relay apparatus 30 has a function of changing a transport speed of a sheet on which an image is formed by the image forming apparatus 20 to a transport speed of the post-processing apparatus 80 and transporting the sheet to the interposer 40 in a subsequent stage. The relay apparatus 30 according to the exemplary embodiment further has a function of performing post-processing on the sheet on which an image is formed by the image forming apparatus 20.

Here, the post-processing function performed by the relay apparatus 30 includes at least one of a sheet cooling function, a curl correction function, a slipsheet insertion function, and a punching function. That is, in the present exemplary embodiment, a post-processing apparatus having such a post-processing function is provided as the relay apparatus 30. The cooling function is a function of reducing the temperature of a sheet formed with an image. The curl correction function is a function of correcting the curl of the sheet. The slipsheet insertion function is a function of inserting a set slipsheet into the middle of plural sheets formed with images.

The relay apparatus 30 performs post-processing such as cooling, curl correction, slipsheet insertion, or punching on the sheet on which an image is formed by the image forming apparatus 20, and transports the sheet to the interposer 40 in a subsequent stage.

The interposer 40 is a slipsheet insertion apparatus that inserts a set slipsheet in the middle of a transport path.

The charge eliminating apparatus 50 performs charge elimination of reducing a charge amount of a charged sheet. A specific structure for eliminating the charge from the sheet by the charge eliminating apparatus 50 will be described later.

The post-processing apparatus 80 performs post-processing on the sheet on which an image is formed by the image forming apparatus 20. Specifically, the post-processing apparatus 80 has one or plural functions of a creasing function, a cutting function, a bookbinding function, a binding function, a stacking function, an alignment function, a punching function, and a sheet discharge function for the sheet on which an image is formed by the image forming apparatus 20. Here, the creasing function is a function of creasing a sheet. The cutting function is a function of cutting tops and bottoms and fore edges of sheets formed as a booklet. The bookbinding function is also referred to as a booklet function and is a function of bundling plural sheets into a booklet. The binding function is also referred to as a stapling function and is a function of binding plural sheets using a staple. The stacking function is a function of sequentially stacking transported sheets on a tray. The alignment function is also referred to as a tamper/jogger fence function and is a function of aligning a sheet in a width direction or the like. The punching function is a function of forming a punched hole in a predetermined position of a sheet.

The image forming system 10 according to the present exemplary embodiment further includes the interposer 40 that is a slipsheet insertion apparatus that inserts a set slipsheet into the middle of the transport path.

The image forming system 10 according to the present exemplary embodiment further includes the inspection apparatus 60 that inspects whether an image is normally formed on a sheet.

The inspection apparatus 60 receives the sheet on which an image is printed from the image forming apparatus 20 from a preceding stage, and performs inspection of the image printed on the sheet, that is, determines whether there is an abnormality in the image printed on the sheet. Specifically, the inspection apparatus 60 receives image data of the image printed on the sheet from the image forming apparatus 20, reads the image on the sheet transported from the image forming apparatus 20, collates the image of the received image data with the read image, and determines whether the image printed on the transported sheet is abnormal.

The stacker 70 accommodates the sheet on which an image is printed by the image forming apparatus 20 therein when the sheet is transported to the stacker 70.

Since the image forming system 10 according to the present exemplary embodiment is configured as described above, the sheet on which an image is printed in the image forming apparatus 20 is transported in an order of the relay apparatus 30, the interposer 40, the charge eliminating apparatus 50, the inspection apparatus 60, the stacker 70, and the post-processing apparatus 80, and various processes are performed.

Here, the image forming apparatus 20 performs printing in which an electrostatic latent image is formed by irradiating a charged photoreceptor with a laser beam or the like, the formed electrostatic latent image is developed with a colorant such as a toner, the developed image is transferred to a sheet, and then fixing processing is performed. For this reason, a sheet or the like on which an image is formed in the image forming apparatus 20 is usually charged. In particular, when a high-resistance dielectric such as a resin film is used as the recording medium, the electric charge charged on the recording medium may increase. When a front surface of the recording medium is charged with, for example, negative electric charge having a negative polarity, positive electric charge having a positive polarity is induced on a back surface of the recording medium by dielectric polarization. As a result, when recording media are attracted to each other by electrostatic attraction and post-processing is performed in the post-processing apparatus 80 in a state where the recording media are charged, the recording media may overlap each other on a sheet discharge tray and are thus charged and adhered to each other, or may discharge charge to a human body.

Further, when the recording medium such as a charged sheet passes through the inspection apparatus 60, noise may be generated at the time of inspection and the inspection result may be incorrect.

For this reason, in the image forming system 10 according to the present exemplary embodiment, the charge eliminating apparatus 50 that eliminates charge of reducing the electric charge charged on the recording medium is provided at a subsequent stage of the image forming apparatus 20.

Figure 2:
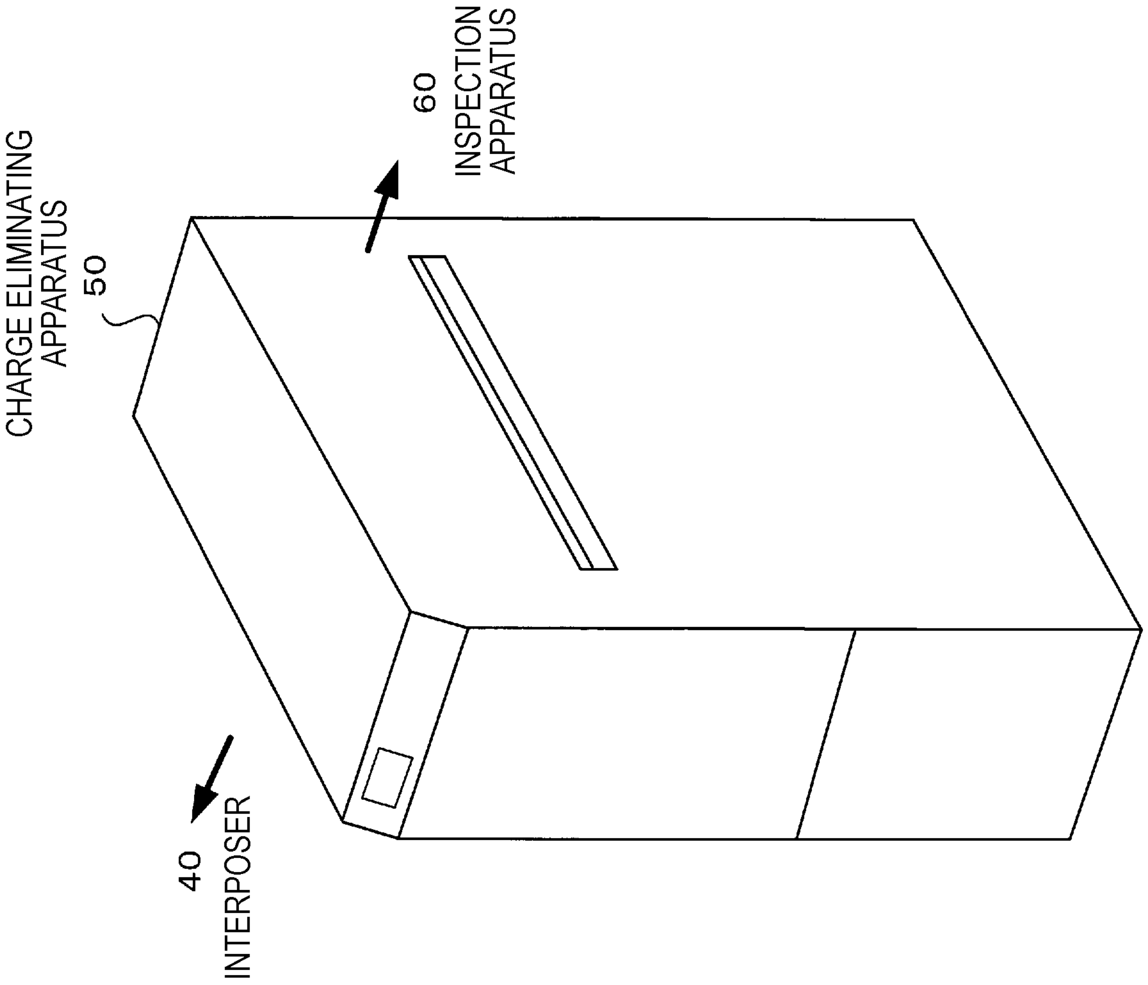
FIG. 2 is a perspective view illustrating an external appearance of a charge eliminating apparatus 50 illustrated in FIG. 1.

An external appearance of the charge eliminating apparatus 50 illustrated in FIG. 1 will be described with reference to a perspective view of FIG. 2. As illustrated in FIG. 2, the charge eliminating apparatus 50 is connectable to other apparatuses at a preceding stage and a subsequent stage, receives a sheet transported from the apparatus at the preceding stage, performs charge elimination processing, and then transports the sheet to the apparatus at the subsequent stage. Since the image forming system 10 according to the present exemplary embodiment is configured as illustrated in FIG. 1, the charge eliminating apparatus 50 receives the sheet transported from the interposer 40 at the preceding stage, performs the charge elimination processing, and then transports the sheet after charge elimination to the inspection apparatus 60 at the subsequent stage.

Figure 3:
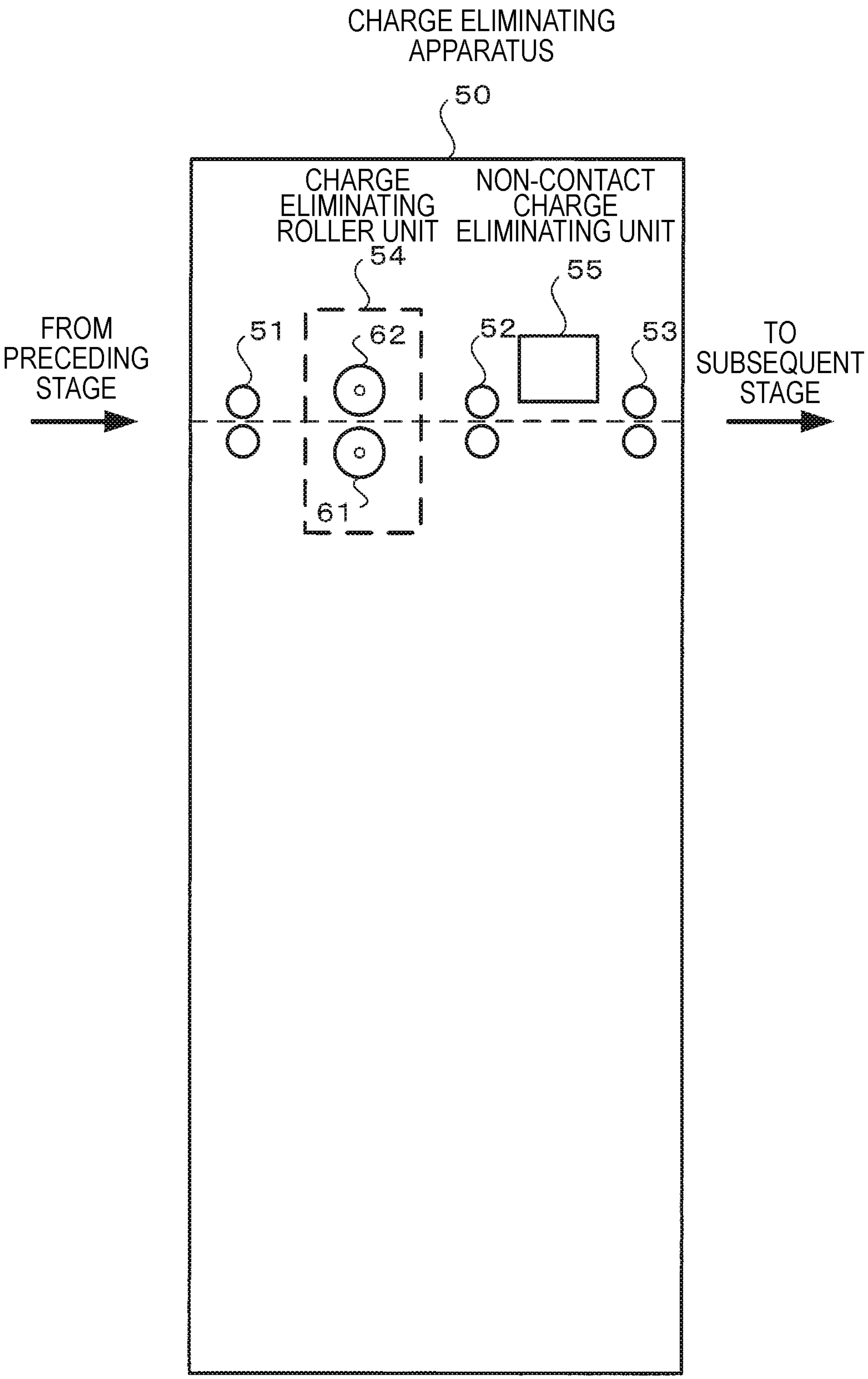
FIG. 3 illustrates a structure of the charge eliminating apparatus 50 illustrated in FIG. 2.

Next, the structure of the charge eliminating apparatus 50 illustrated in FIG. 2 will be described with reference to FIG. 3. FIG. 3 is a perspective view of the inside of the charge eliminating apparatus 50 illustrated in FIG. 2 when viewed from the front.

As illustrated in FIG. 3, the charge eliminating apparatus 50 is configured to transport a sheet transported from an apparatus at the preceding stage to an apparatus at the subsequent stage by three pairs of transport rollers 51 to 53. A charge eliminating roller unit 54 is provided between the pair of transport rollers 51 and the pair of transport rollers 52, and a non-contact charge eliminating unit 55 is provided between the pair of transport rollers 52 and the pair of transport rollers 53.

The charge eliminating roller unit 54 includes two charge eliminating rollers 61, 62. The two charge eliminating rollers 61, 62 sandwich and transport a sheet to perform charge elimination. The charge eliminating roller unit 54 is detachable from the body of the charge eliminating apparatus 50.

Details of the charge elimination of the sheet by the charge eliminating roller unit 54 illustrated in FIG. 3 will be described with reference to FIG. 4.

Figure 4:
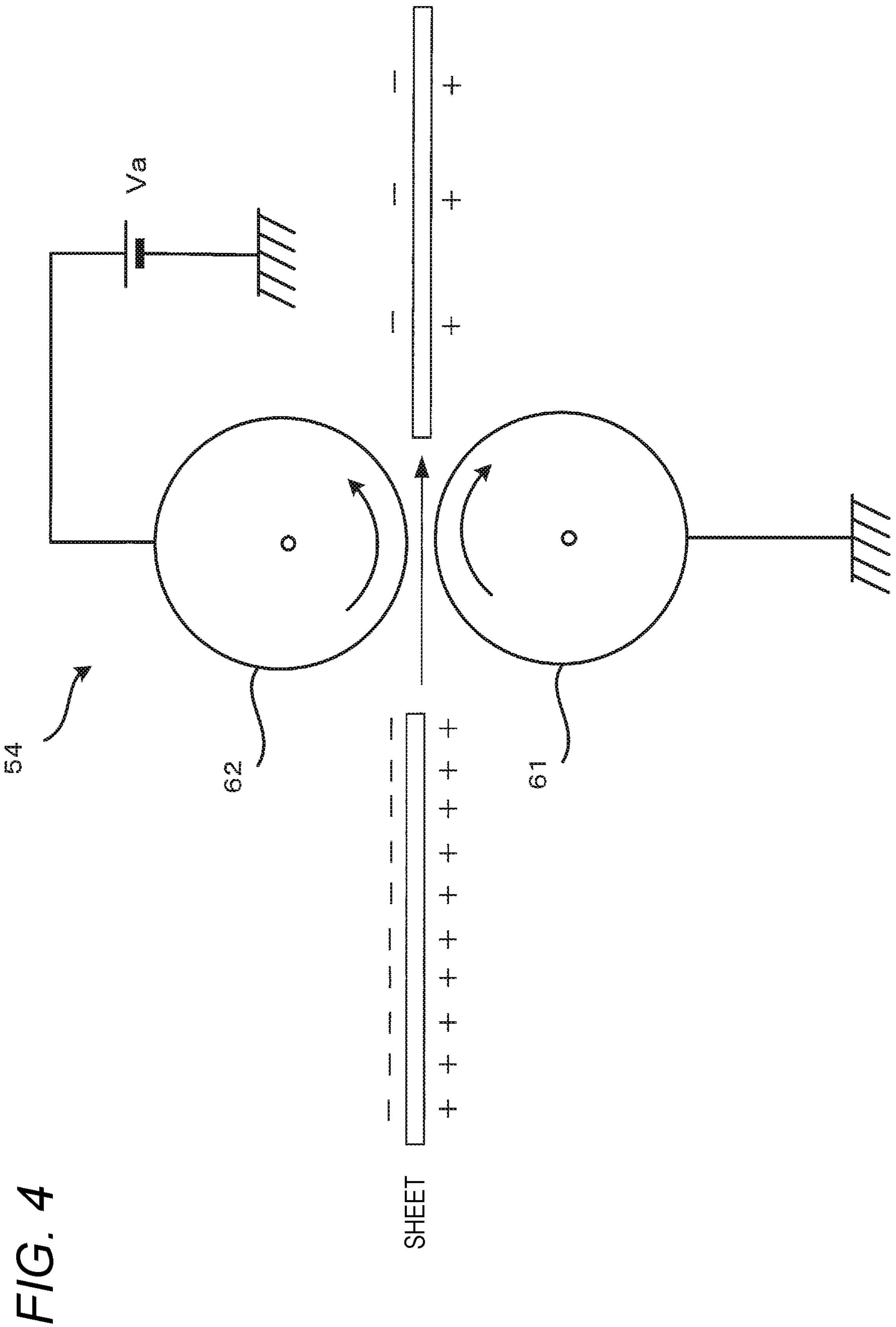
FIG. 4 illustrates details when a charge eliminating roller unit 54 illustrated in FIG. 3 performs charge elimination on a sheet.

As illustrated in FIG. 4, the charge eliminating rollers 61, 62 constitute a pair, a driving force from a driving motor is transmitted to the charge eliminating roller 62, and the charge eliminating roller 61 is brought into contact with the charge eliminating roller 62 to be driven by the charge eliminating roller 62.

A charge eliminating power supply is connected to the charge eliminating roller 62, and a charge eliminating bias Va, for example, is applied from the charge eliminating power supply to the charge eliminating roller 62. In the present exemplary embodiment, a positive DC voltage is used as the charge eliminating bias Va. The charge eliminating roller 61 is grounded.

In the charge eliminating roller unit 54, when the charge eliminating bias Va is applied to the charge eliminating roller 62, the charge eliminating roller unit 54 applies positive electric charge to the front surface of the charged sheet as the sheet passes through. As a result, the nonpolar negative electric charge on the front surface of the sheet is eliminated by an amount of electric charge applied to the sheet. As the electric charge on the front surface of the sheet decreases, the positive electric charge having the positive polarity that is dielectric-polarized on the back surface of the sheet also decreases.

In this way, the charge eliminating roller unit 54, which is a contact charge eliminator, functions as a contact charge eliminator and comes into direct contact with the sheet to apply electric charge thereto, so that a large amount of charge can be eliminated to some extent. However, a variation amount of a surface potential of the sheet after charge elimination is large, and the charge elimination tends to be not uniform.

The non-contact charge eliminating unit 55 is, for example, a corotron type charge eliminating device or a scorotron type charge eliminating device, and has a function of eliminating electric charge without coming into contact with the sheet by supplying the sheet with ions generated by performing corona discharge using, for example, an AC voltage. With the non-contact charge eliminating unit 55, although a large amount of charge elimination cannot be ensured, the variation amount of the surface potential after charge elimination is small and the charge elimination can be uniformly performed.

In the charge eliminating apparatus 50 according to the present exemplary embodiment, the charge eliminating roller unit 54 and the non-contact charge eliminating unit 55, which are two charge eliminators having different characteristics, perform charge elimination on the sheet transported from an apparatus at the preceding stage, and transport the sheet to an apparatus at the subsequent stage.

However, in any of the charge eliminators of the charge eliminating roller unit 54 and the non-contact charge eliminating unit 55, an amount of electric charge to be eliminated varies depending on time for passage of the sheet. That is, the amount of electric charge to be eliminated increases as the time for passage of the sheet increases, and the amount of electric charge to be eliminated decreases as the time for passage of the sheet decreases.

Here, the transport speed of the sheet or the like in the image forming apparatus 20 is slower than the transport speed of the sheet or the like in the post-processing apparatus 80. For this reason, the sheet on which an image is formed in the image forming apparatus 20 is transported to the post-processing apparatus 80 after the transport speed is increased.

For this reason, if the charge eliminating apparatus 50 is connected immediately after the image forming apparatus 20, the transport speed increases during the charge elimination in the charge eliminating apparatus 50, and the charge elimination would not be uniformly performed.

Therefore, in the image forming system 10 according to the present exemplary embodiment, the relay apparatus 30 is provided between the charge eliminating apparatus 50 and the image forming apparatus 20.

That is, in the image forming system 10 according to the present exemplary embodiment, the charge eliminating apparatus 50 is provided at a stage after the relay apparatus 30 and a stage before the post-processing apparatus 80.

As described above, the relay apparatus 30 has a function of changing the transport speed of the sheet on which an image is formed by the image forming device 20 to the transport speed of the post-processing apparatus 80 and transporting the sheet to the interposer 40 at the subsequent stage. For this reason, what is transported to the charge eliminating apparatus 50 is the sheet having the transport speed increased after passing through the relay apparatus 30. The relay apparatus 30 has a transport path longer than the sheet in the transport direction. A reason why the length of the transport path in the relay apparatus 30 is set in this manner will be described later.

In the image forming system 10 according to the present exemplary embodiment, the interposer 40 is provided in the middle of the transport path of the sheet, so that a slipsheet can be inserted in the middle of the transport path.

However, the slipsheet is usually used in a state in which characters are printed, and the slipsheet may be set in the interposer 40 in a charged state. The slipsheet may also be charged when inserted by the interposer 40. When the interposer 40 is provided at a stage after the charge eliminating apparatus 50, a sheet in a charged state would be transported to the post-processing apparatus 80.

For this reason, in the present exemplary embodiment, the charge eliminating apparatus 50 is provided at a stage after the interposer 40.

As described above, when the sheet passes through the inspection apparatus 60 in a charged state, noise may be generated at the time of inspection in the inspection apparatus 60 and the inspection result may be incorrect. For this reason, the charge eliminating apparatus 50 is provided at a stage before the inspection apparatus 60.

Figure 5:
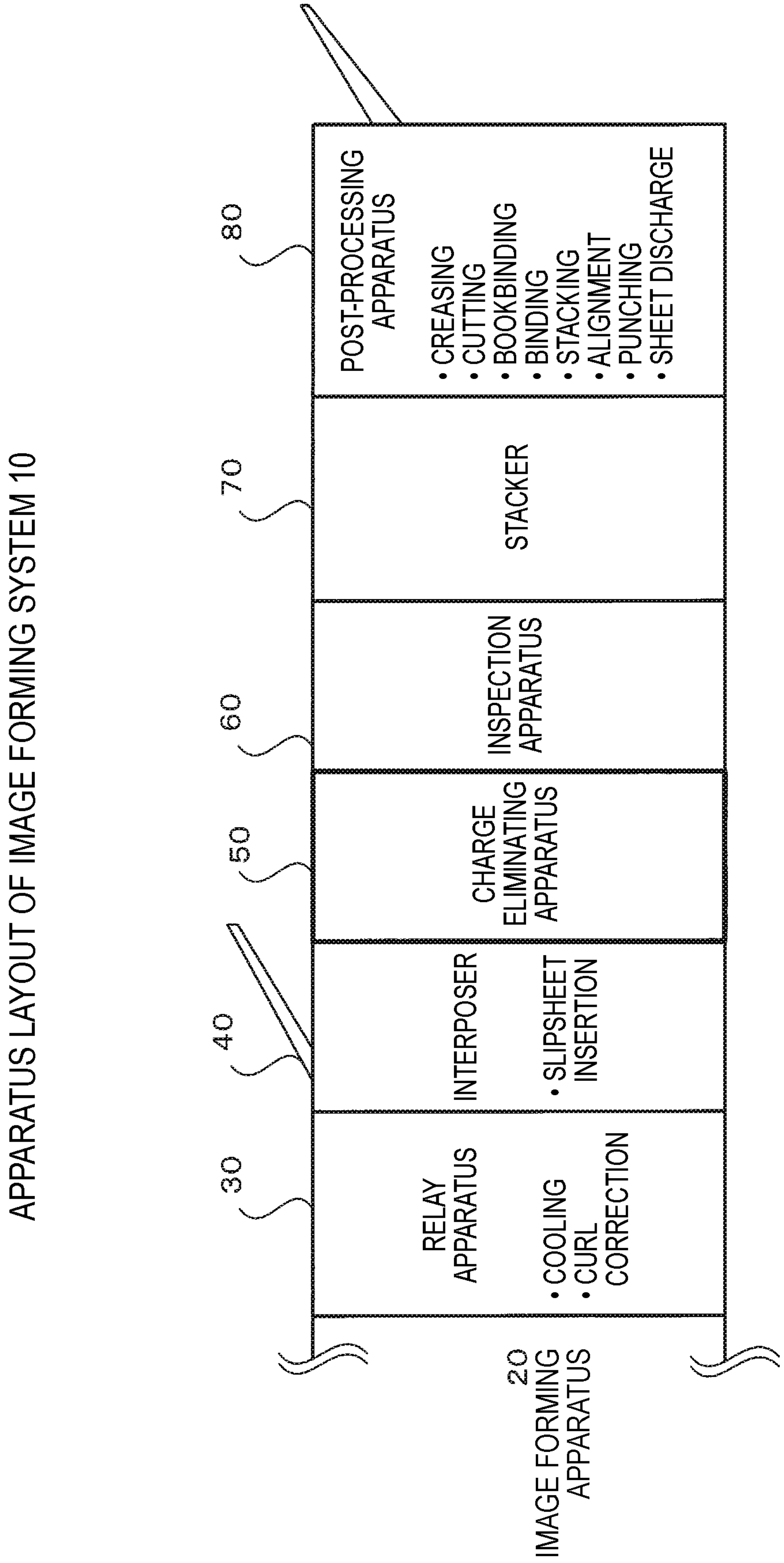
FIG. 5 illustrates an apparatus layout of the image forming system 10 illustrated in FIG. 1.

FIG. 5 illustrates an apparatus layout of the image forming system 10 according to the present exemplary embodiment described above.

As illustrated in FIG. 5, the relay apparatus 30 is provided between the charge eliminating apparatus 50 and the image forming apparatus 20, and the transport speed of the sheet transported to the charge eliminating apparatus 50 has already been increased. The charge eliminating apparatus 50 is provided at a stage after the interposer 40 and a stage before the inspection apparatus 60.

Figure 6:
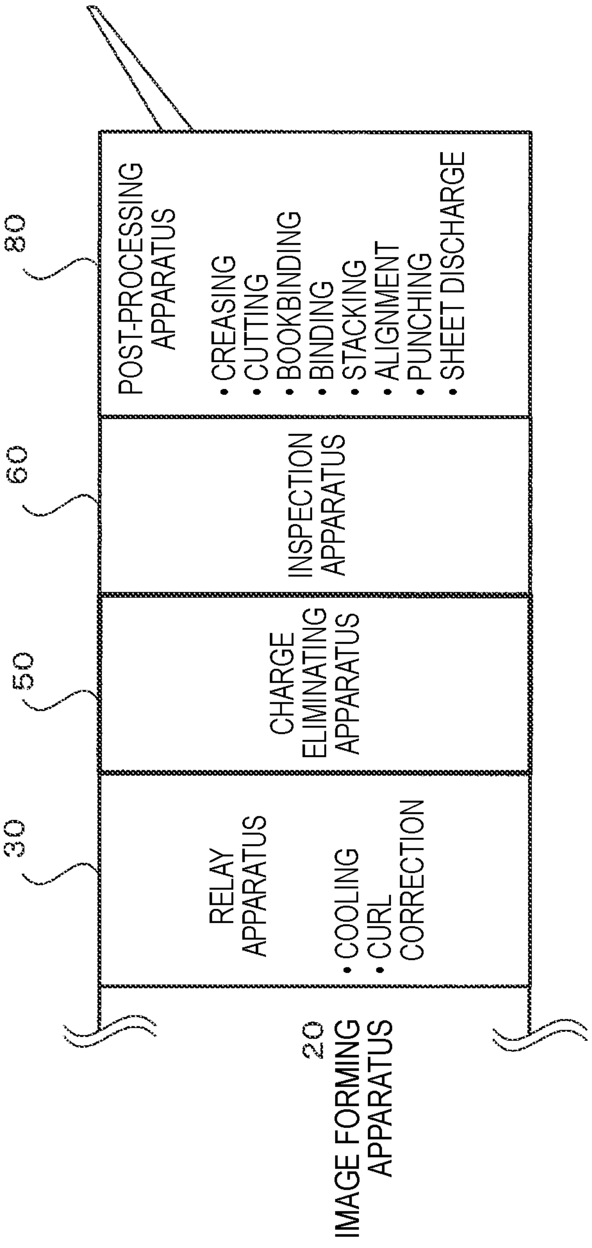
FIG. 6 illustrates an apparatus layout of another image forming system.

FIG. 6 illustrates an apparatus layout of an image forming system in which the interposer 40 and the stacker 70 are not provided. As illustrated in FIG. 6, even in the case of the apparatus layout in which the interposer 40 and the stacker 70 are not provided, the above-described problem can also be prevented if the charge eliminating apparatus 50 is provided at a stage after the relay apparatus 30 and the relay apparatus 30 is provided between the charge eliminating apparatus 50 and the image forming apparatus 20.

Figure 7:
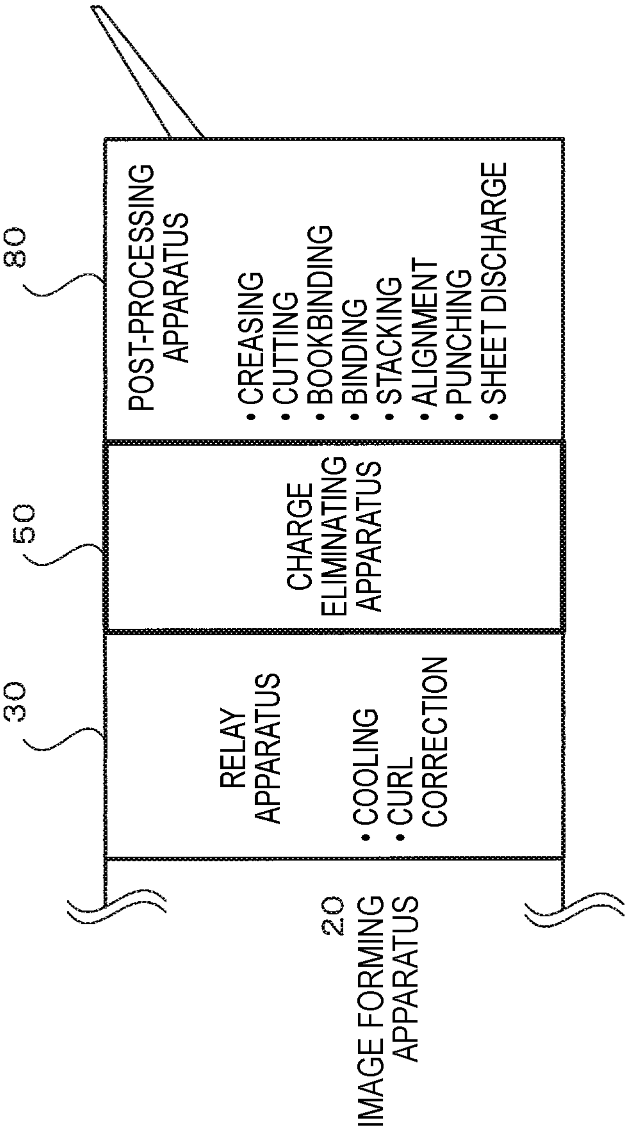
FIG. 7 illustrates an apparatus layout of another image forming system.

FIG. 7 illustrates an apparatus layout of an image forming system in which the inspection apparatus 60 is not provided. As illustrated in FIG. 7, even in the case of the apparatus layout in which the inspection apparatus 60 is not provided, the above-described problem can also be prevented if the charge eliminating apparatus 50 is provided at a stage after the relay apparatus 30 and a stage before the post-processing apparatus 80.

Figure 8:
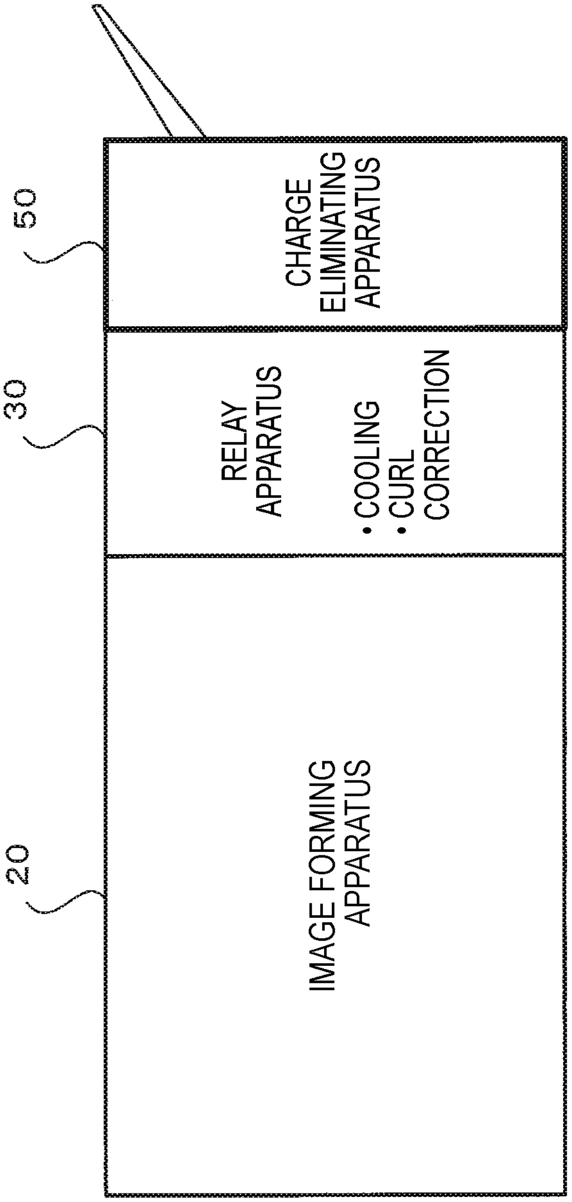
FIG. 8 illustrates an apparatus layout of another image forming system.

FIG. 8 illustrates an apparatus layout of an image forming system in which a discharge tray is attached to the charge eliminating apparatus 50 and the post-processing apparatus 80 is not provided.

FIG. 8 illustrates a case where the charge eliminating apparatus 50 is used in a state where the discharge tray is attached thereto, and the post-processing apparatus 80 is not provided. Even in the case of such an apparatus layout, when the charge eliminating apparatus 50 is provided at a stage after the relay apparatus 30, the sheet after the transport speed is changed is fed to the charge eliminating apparatus 50.

Figure 9:
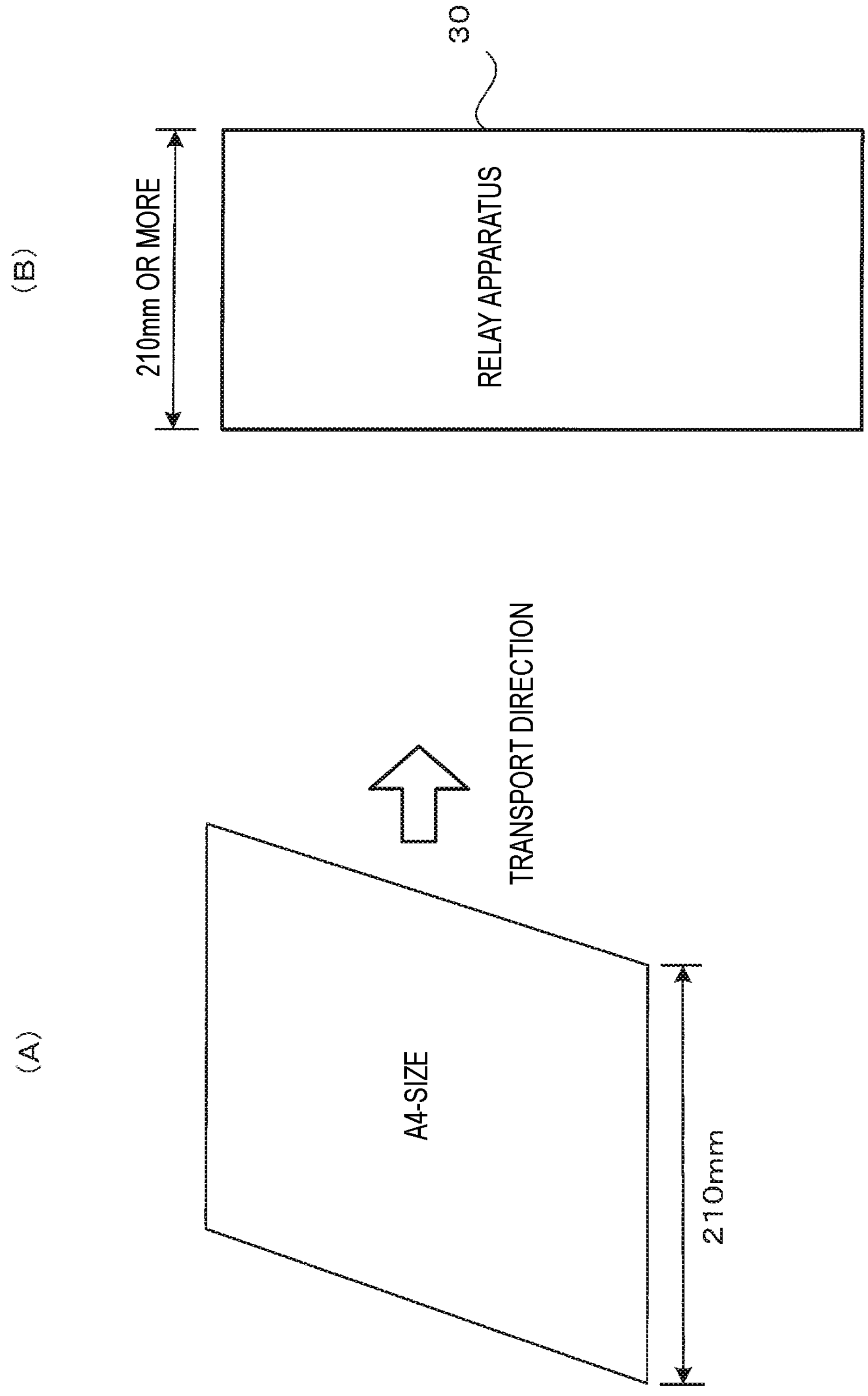
FIG. 9 illustrates a reason why a relay apparatus 30 has a transport path longer than a sheet in a transport direction.

Finally, the reason why the relay apparatus 30 has a transport path longer than the sheet in the transport direction will be described with reference to FIG. 9. For example, a most frequently used A4-size sheet has a length of 210 mm in the transport direction. For this reason, by setting the horizontal width of the relay apparatus 30, that is, the length of the transport path to 210 mm or more, it is possible to ensure that the sheet after passing through the relay apparatus 30 is transported to an apparatus at the subsequent stage in a state in which the transport speed of the sheet is changed.

For this reason, even when the charge eliminating apparatus 50 is connected immediately after the relay apparatus 30, the transport speed of the sheet transported to the charge eliminating apparatus 50 is a transport speed after change, and is prevented from being changed in the middle of the charge elimination.

The charge eliminating apparatus 50 according to the present exemplary embodiment will be described in detail.

In the charge eliminating apparatus 50 according to the present exemplary embodiment, the charge eliminating roller unit 54 and the non-contact charge eliminating unit 55, which are two charge eliminators having different characteristics, perform charge elimination on the sheet transported from an apparatus at the subsequent stage, and transport the sheet to an apparatus at the subsequent stage.

Then, a controller 56 controls operations of the three pairs of transport rollers 51 to 53, the charge eliminating roller unit 54, and the non-contact charge eliminating unit 55 to perform charge elimination processing on the sheet.

As described above, the charge eliminating roller unit 54 includes the two charge eliminating rollers 61, 62, and the controller 56 controls rotation of the two charge eliminating rollers 61, 62.

The sheet is sandwiched and transported by the two charge eliminating rollers 61, 62 to perform charge elimination. The charge eliminating roller unit 54 is detachable from the body of the charge eliminating apparatus 50.

Figure 10:
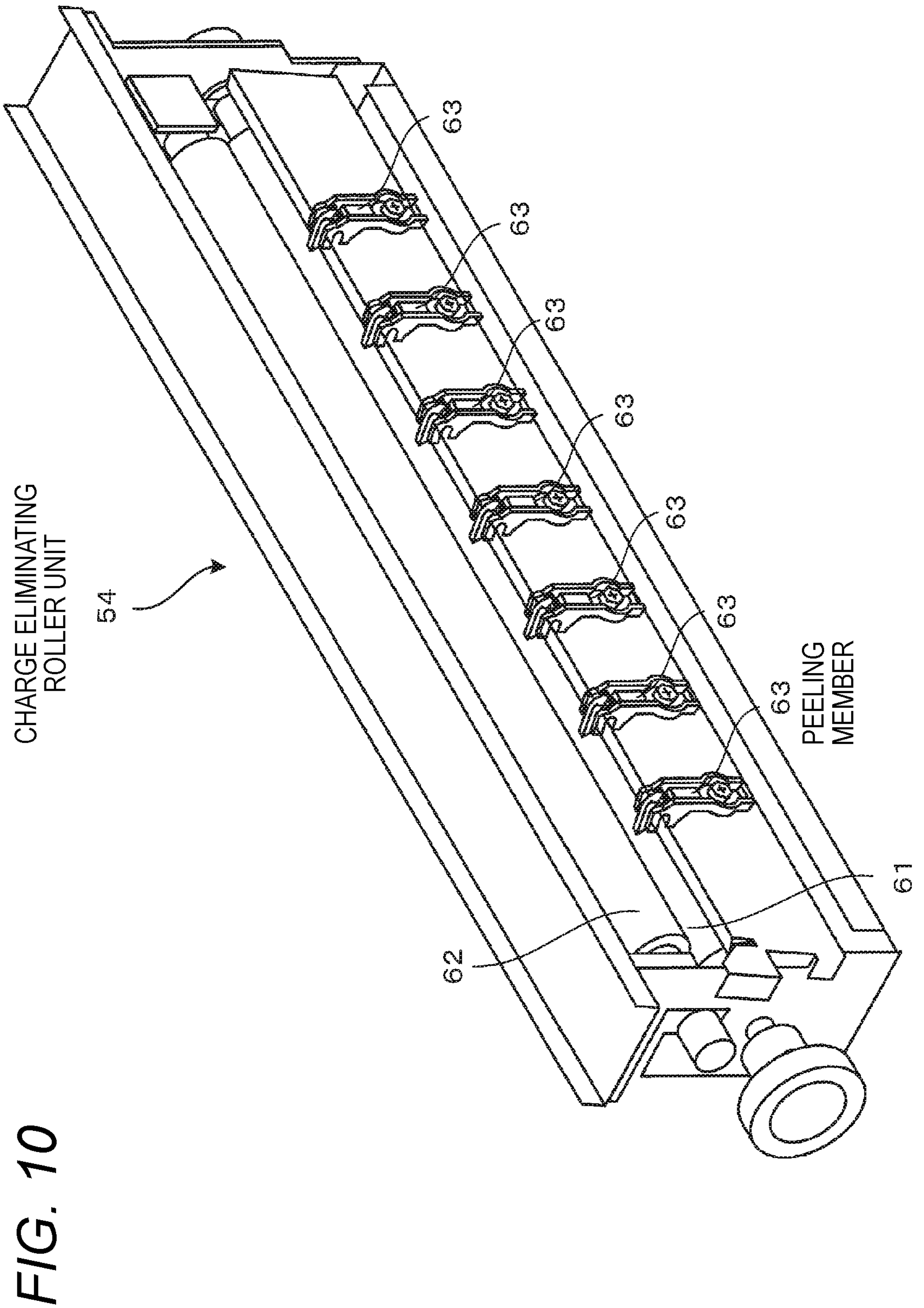
FIG. 10 is a perspective view of the charge eliminating roller unit 54.

A perspective view of the charge eliminating roller unit 54 is illustrated in FIG. 10. As illustrated in FIG. 10, in the charge eliminating roller unit 54, the two charge eliminating rollers 61, 62 are respectively provided on lower and upper sides in a vertical direction, and plural peeling members 63 are abutted against the charge eliminating roller 61 provided on the lower side in the vertical direction.

The peeling members 63 are arranged side by side in the width direction of the transport path along which the sheet is transported.

In this way, the two charge eliminating rollers 61, 62 and the plural peeling members 63 are provided in the charge eliminating roller unit that is insertable into and removable from the body of the charge eliminating apparatus 50.

Figure 11:
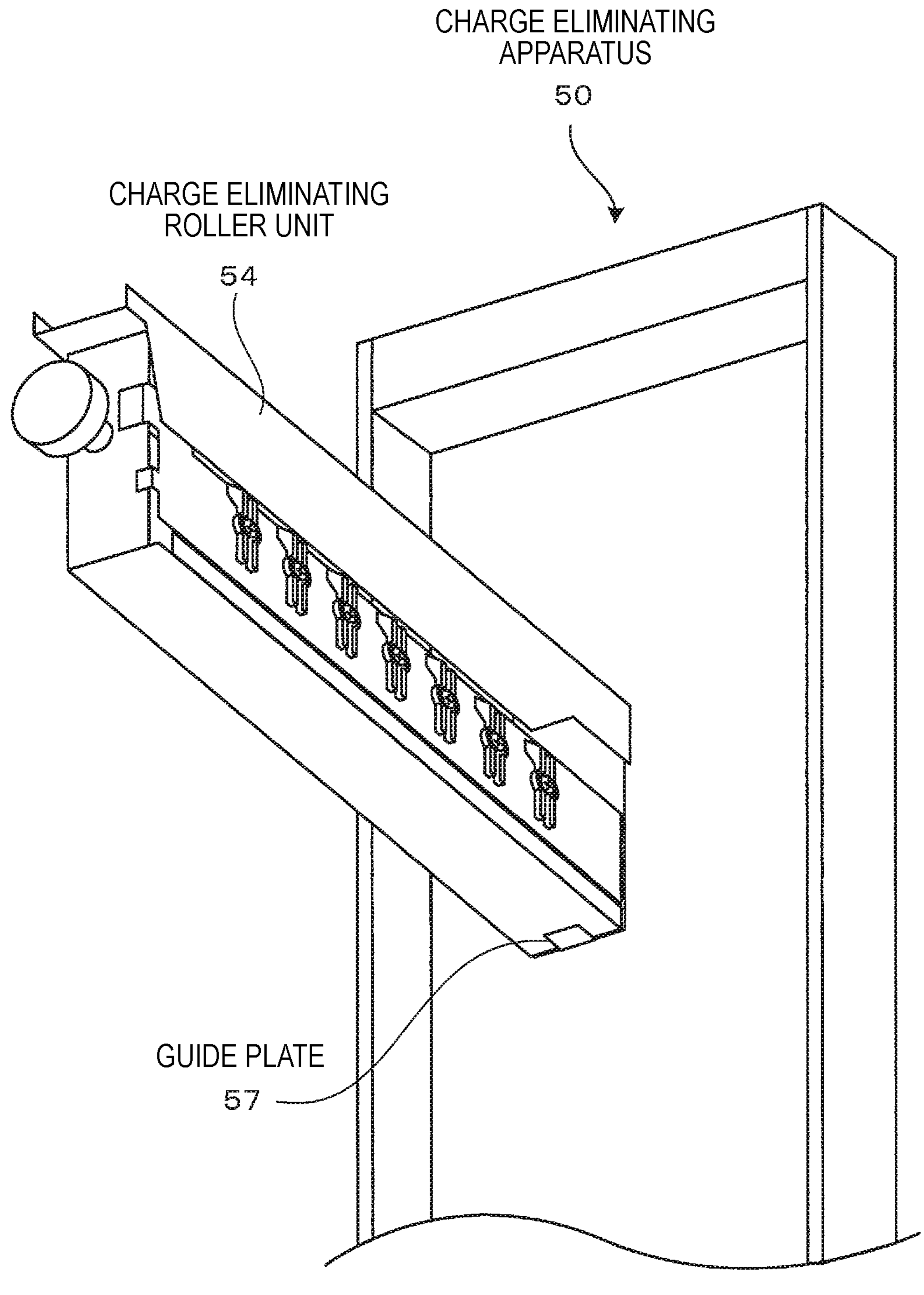
FIG. 11 illustrates a state in which the charge eliminating roller unit 54 is detached from the body of the charge eliminating apparatus 50.

FIG. 11 illustrates a state in which the charge eliminating roller unit 54 is detached from the body of the charge eliminating apparatus 50. As illustrated in FIG. 11, the charge eliminating apparatus 50 includes a guide plate 57 that guides an insertion position of the charge eliminating roller unit 54 when the charge eliminating roller unit 54 is inserted into the body of the charge eliminating apparatus 50. A part of the guide plate 57 protrudes from an attachment opening for attaching the charge eliminating roller unit 54. For this reason, when the charge eliminating roller unit 54 is inserted into the charge eliminating apparatus 50, a user can easily attach the charge eliminating roller unit 54 to the body of the charge eliminating apparatus 50 by placing a lower portion of the charge eliminating roller unit 54 on the guide plate 57.

Figure 12:
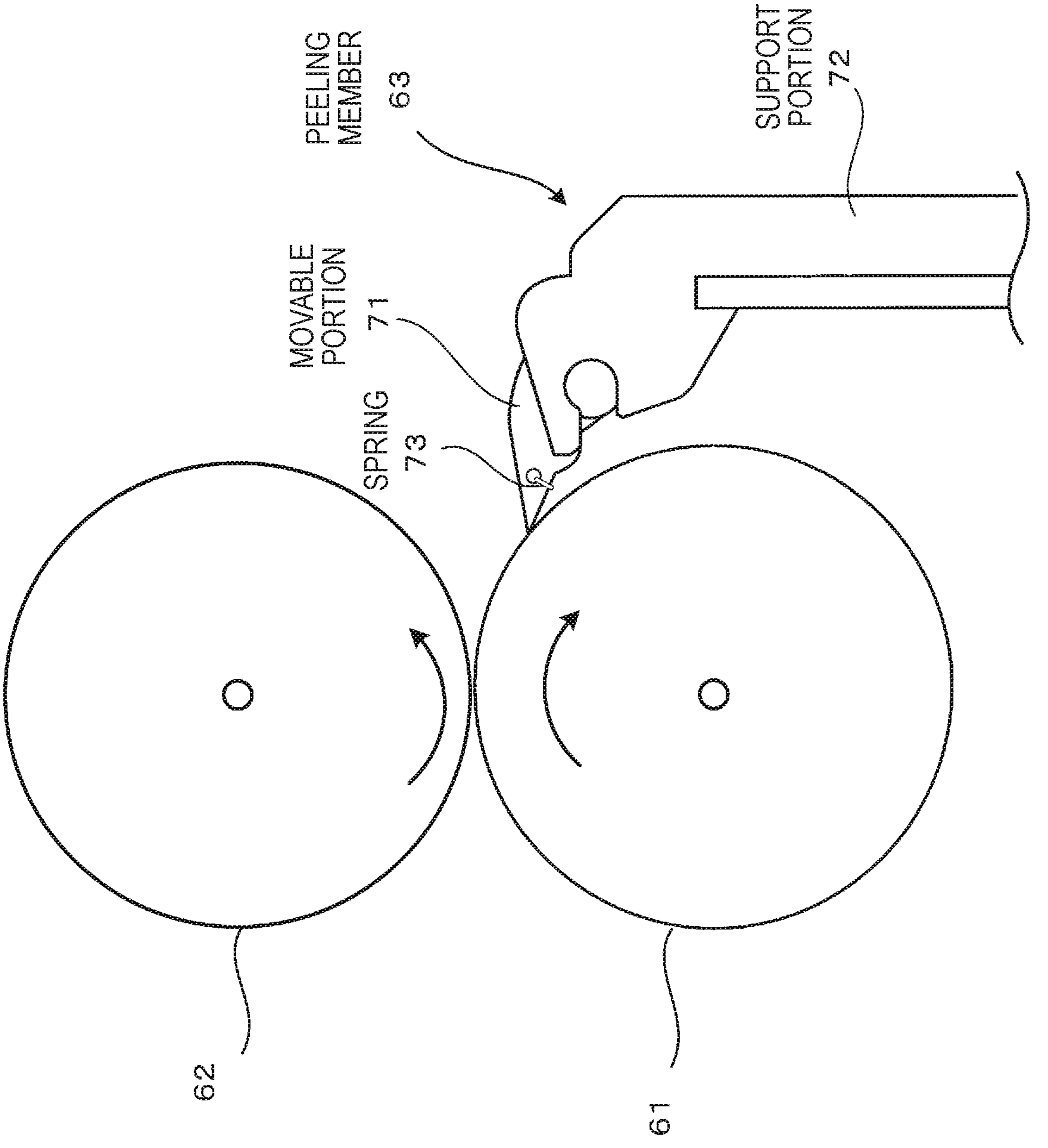
FIG. 12 is a sectional view of the charge eliminating roller unit 54 illustrated in FIG. 10.

Next, a cross-sectional view of the charge eliminating roller unit 54 illustrated in FIG. 10 is illustrated in FIG. 12.

The charge eliminating roller unit 54 includes the two charge eliminating rollers 61, 62 and the peeling members 63. The two charge eliminating rollers 61, 62 are applied with voltages of different potentials and perform charge elimination by reducing the charge amount of the sheet when the sheet passes through the charge eliminating rollers 61, 62.

The peeling members 63 are abutted against a surface of the charge eliminating roller 61 of the two charge eliminating rollers 61, 62, and peel off the sheet adhering to the charge eliminating roller 61 with the rotation of the charge eliminating roller 61.

Each of the peeling members 63 includes a movable portion 71, a support portion 72, and a spring 73 that is an elastic body.

The support portion 72 is fixed to a housing of the charge eliminating roller unit 54 and supports the movable portion 71 to be movable. The movable portion 71 is movably supported by the support portion 72 and is biased toward the surface of the charge eliminating roller 61 by the spring 73. The movable portion 71 is abutted against the surface of the charge eliminating roller 61 by being biased in direction toward the surface of the charge eliminating roller 61 by the spring 73.

A top end portion of the movable portion 71, which is a top end of the peeling member 63, is abutted against the downstream surface of the charge eliminating roller 61 in a forward rotation direction at an acute angle. The peeling member 63 is provided in a position where the peeling member 63 peels off the sheet adhering to the surface of the charge eliminating roller 61 with the rotation of the charge eliminating roller 61.

With the above-described configuration, the peeling member 63 functions to peel off the sheet adhering to the charge eliminating roller 61 with the rotation of the charge eliminating roller 61.

Figure 13:
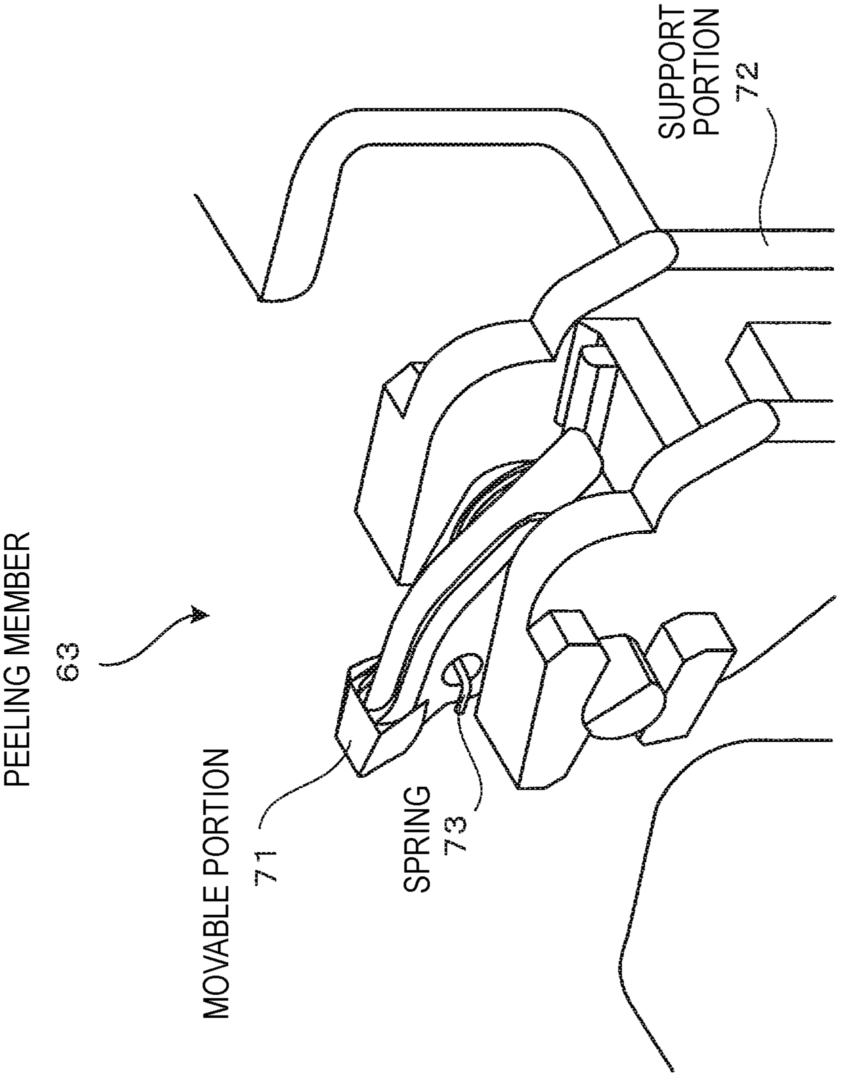
FIG. 13 is an enlarged perspective view of the periphery of a peeling member 63.

FIG. 13 is an enlarged perspective view of the periphery of the peeling member 63. Referring to FIG. 13, it can be seen that the movable portion 71 rotatably attached to the support portion 72 is biased by the spring 73.

Figure 14:
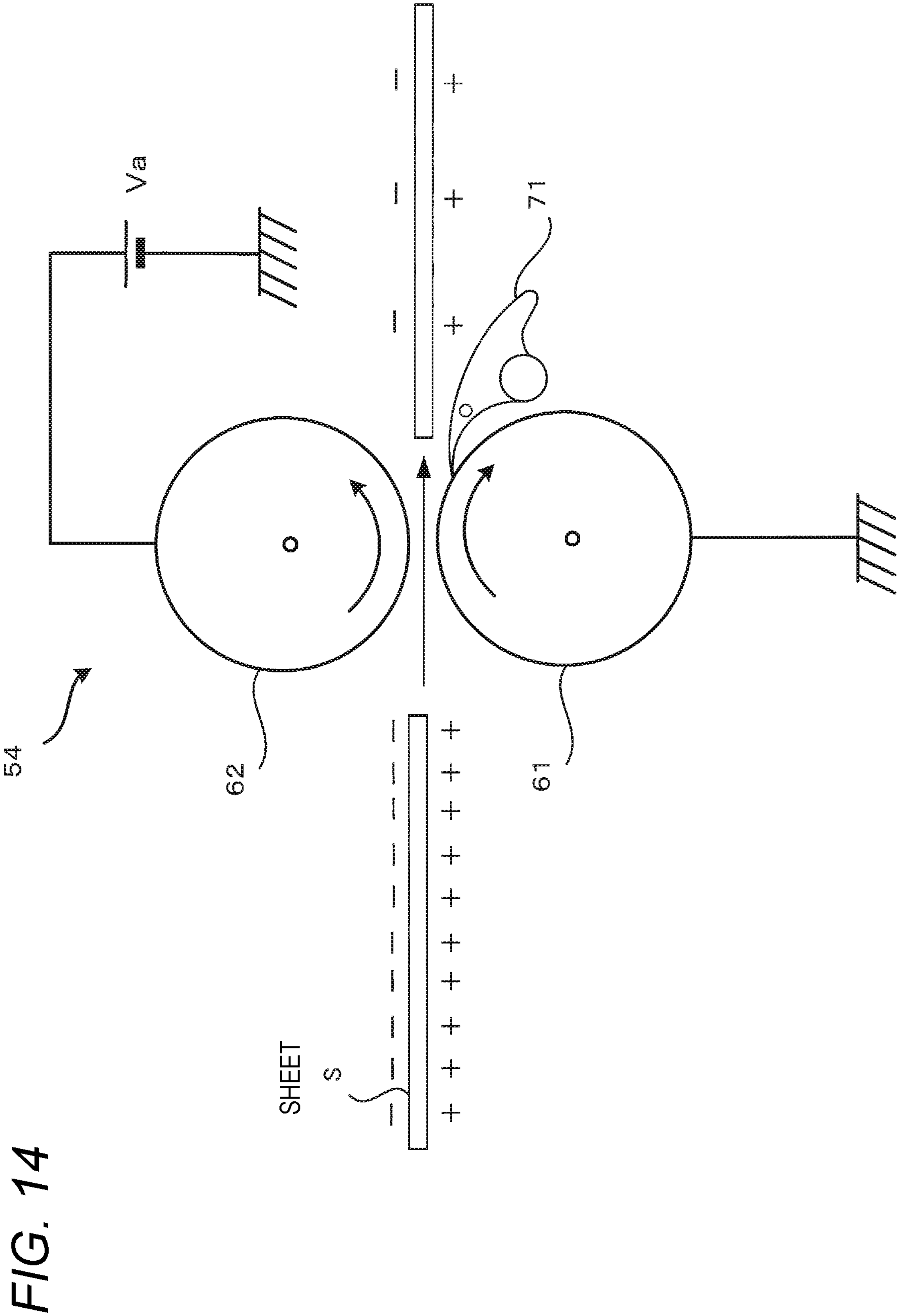
FIG. 14 illustrates details when the charge eliminating roller unit 54 illustrated in FIG. 3 performs charge elimination on a sheet.

Next, details of the charge elimination of the sheet by the charge eliminating roller unit 54 illustrated in FIG. 3 will be described with reference to FIG. 14. In FIG. 14, only the movable portion 71 of the peeling member 63 is schematically illustrated instead of illustrating the entire peeling member 63.

As illustrated in FIG. 14, the charge eliminating rollers 61, 62 constitute a pair, a driving force from a driving motor is transmitted to the charge eliminating roller 62, and the charge eliminating roller 61 is brought into contact with the charge eliminating roller 62 to be driven by the charge eliminating roller 62.

A charge eliminating power supply is connected to the charge eliminating roller 62, and the charge eliminating bias Va, for example, is applied from the charge eliminating power supply to the charge eliminating roller 62. In the present exemplary embodiment, a positive DC voltage is used as the charge eliminating bias Va. The other charge eliminating roller 61 is grounded.

In the charge eliminating roller unit 54, when the charge eliminating bias Va is applied to the charge eliminating roller 62, the charge eliminating roller unit 54 applies positive electric charge to the front surface of the charged sheet as the sheet passes through. As a result, the nonpolar negative electric charge on the front surface of the sheet is eliminated by an amount of electric charge applied to the sheet. As the electric charge on the front surface of the sheet decreases, the positive electric charge having the positive polarity that is dielectric-polarized on the back surface of the sheet also decreases.

A top end of the movable portion 71 constituting a part of the peeling member 63 is abutted against the surface of the charge eliminating roller 61. The peeling member 63 functions to peel the sheet adhering to the charge eliminating roller 61 with the rotation of the charge eliminating roller 61.

Figure 15:
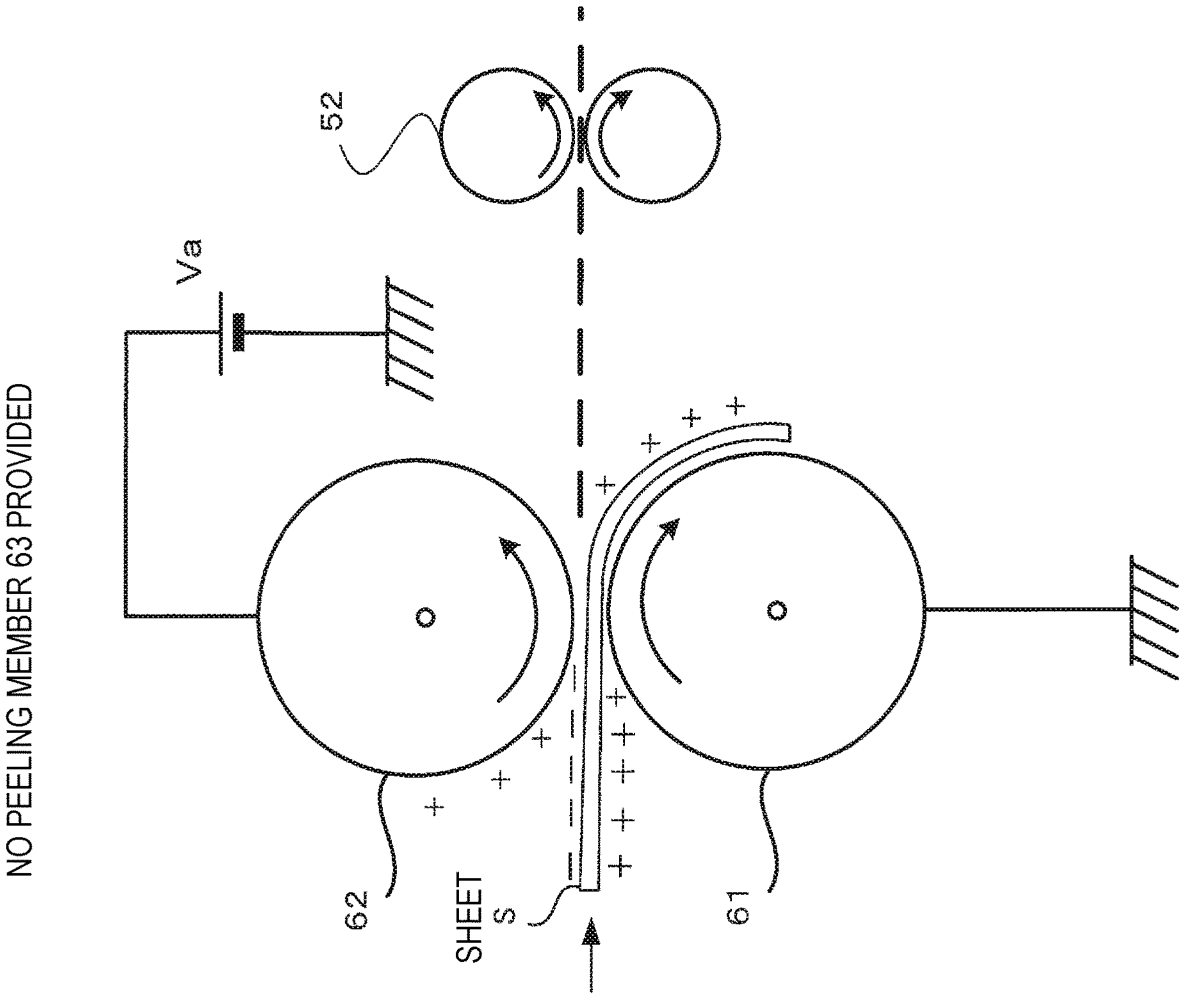
FIG. 15 illustrates a state in which a sheet winds around a charge eliminating roller 61 when the peeling member 63 is not provided in the charge eliminating roller unit 54.

The peeling member 63 is provided to prevent sheet jam due to winding of the sheet after charge elimination around the charge eliminating roll 61 on a ground side. FIG. 15 illustrates a state in which the sheet winds around the charge eliminating roller 61 when the peeling member 63 is not provided on the charge eliminating roller unit 54.

FIG. 15 illustrates a state in which, when charge elimination is performed on a sheet S, the sheet S is charged due to positive electric charge applied to the sheet from the charge eliminating roller 62 having a positive potential to which the charge eliminating bias Va is applied, and the sheet S is wound around the charge eliminating roller 61 due to an increase in a potential difference between the sheet S and the charge eliminating roller 61 on the ground side that serves as a counter electrode. Such winding around the charge eliminating roller 61 is likely to occur when charge elimination is performed on a so-called low-stiffness sheet, for example, a thin sheet.

When the sheet S winds around the charge eliminating roller 61 in this way, the sheet S after charge elimination would not reach the pair of transport rollers 52 and the sheet jam occurs.

Next, a state in which the sheet is prevented from being wound around the charge eliminating roller 61 by the peeling member 63 will be described with reference to FIGS. 16 and 17.

Figure 16:
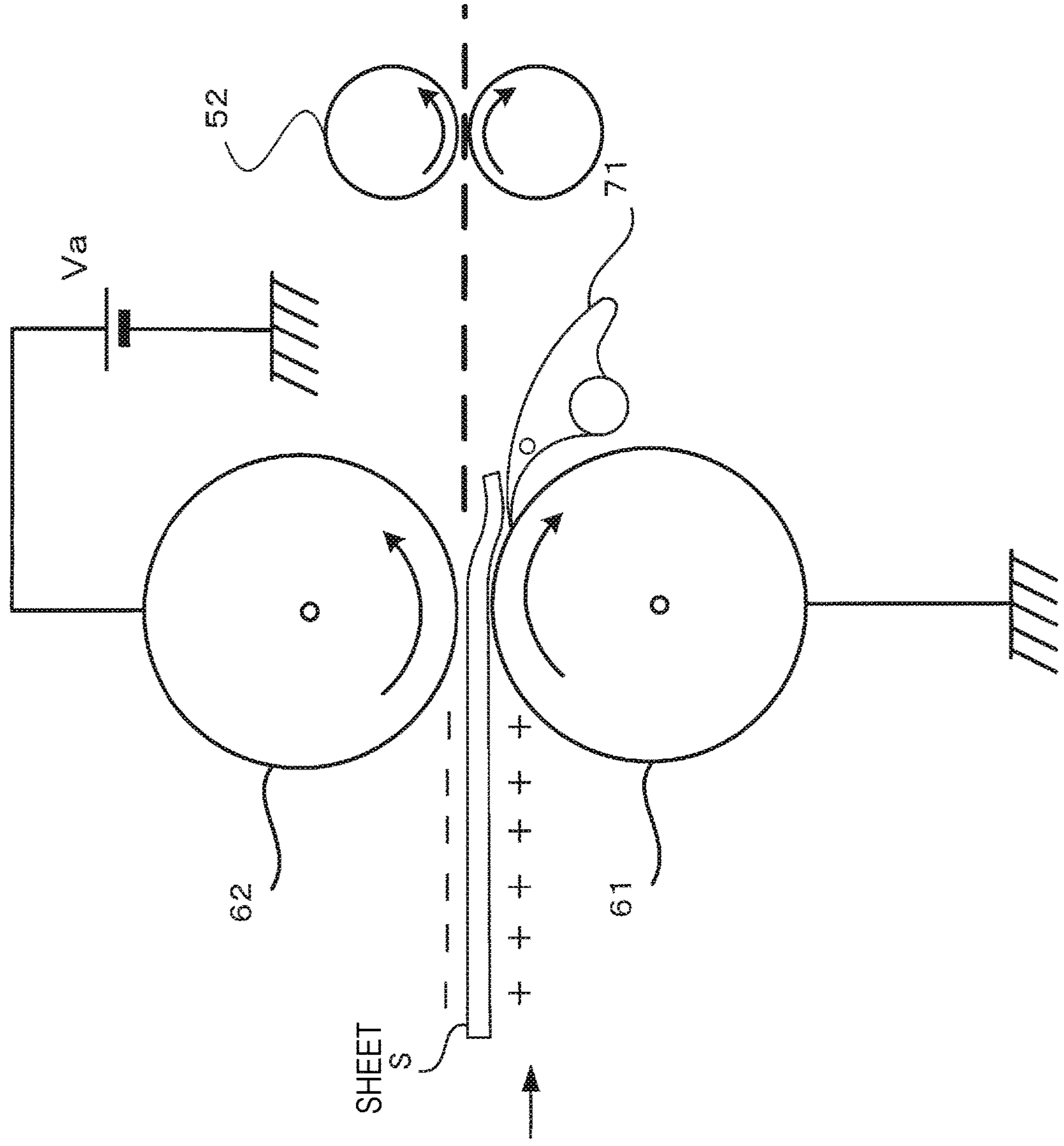
FIG. 16 illustrates a state in which a sheet is prevented from being wound around the charge eliminating roller 61 by the peeling member 63.

In the case where the peeling member 63 is provided as illustrated in FIG. 16, the top end portion of the movable portion 71 of the peeling member 63 is in direct contact with the surface of the charge eliminating roller 61. The top end portion of the movable portion 71 defines an acute angle with the downstream surface of the charge eliminating roller 61. For this reason, as illustrated in FIG. 16, even when the sheet S that has passed through between the two charge eliminating rollers 61, 62 adheres to the charge eliminating roller 61, a leading end of the sheet S is separated from the surface of the charge eliminating roller 61 by the movable portion 71.

Figure 17:
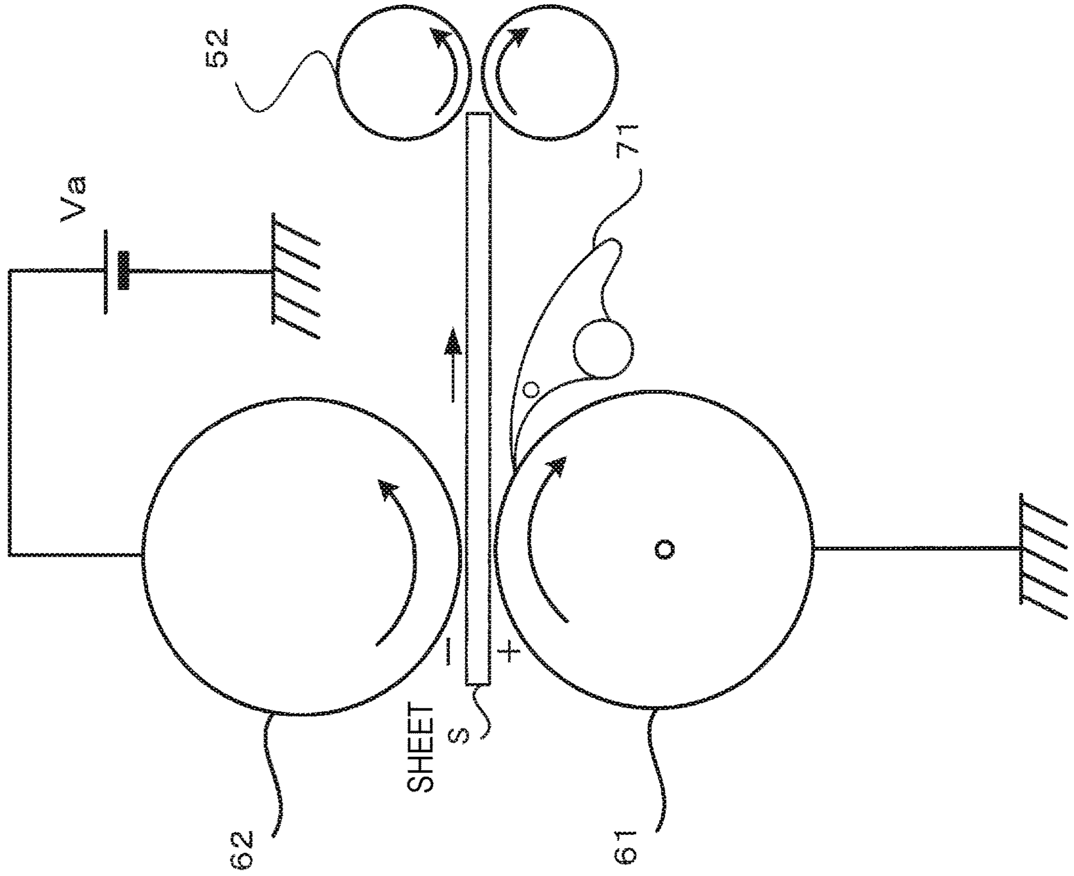
FIG. 17 illustrates a state in which a sheet is prevented from being wound around the charge eliminating roller 61 by the peeling member 63.

As a result, as illustrated in FIG. 17, the sheet S reaches the pair of transport rollers 52 normally and is transported to an apparatus at the subsequent stage without sheet jam.

Next, rotation control of the charge eliminating rollers 61, 62 will be described. As described above, in the charge eliminating apparatus 50, the rotation of the charge eliminating rollers 61, 62 is controlled by the controller 56 illustrated in FIG. 3.

The controller 56 controls, before controlling the two charge eliminating rollers 61, 62 to perform forward rotation operation of rotating in the forward rotation direction in which the sheet passes through between the two charge eliminating rollers 61, 62 and is transported to the subsequent stage, the charge eliminating roller 61 provided with the peeling member 63 to perform reverse rotation operation of rotating in the reverse rotation direction opposite to the forward rotation direction.

The controller 56 also controls the charge eliminating roller 61 to perform the reverse rotation operation not only at the start of a printing processing on the sheet but also after the printing processing on the sheet based on a print job that is a print instruction.

At this time, the controller 56 controls the charge eliminating roller 61 to temporarily stop after the reverse rotation operation, and to then perform the forward rotation operation.

When the charge eliminating roller 61 performs the forward rotation operation after the reverse rotation operation, the controller 56 performs control to gradually increase the rotation speed of the charge eliminating roller 61 during the forward rotation operation until steady rotation.

A reason why the controller 56 does not control the two charge eliminating rollers 61, 62 to perform the forward rotation operation from a stop state when the controller 56 performs charge elimination on the sheet in this way will be described with reference to FIG. 18.

Figure 18:
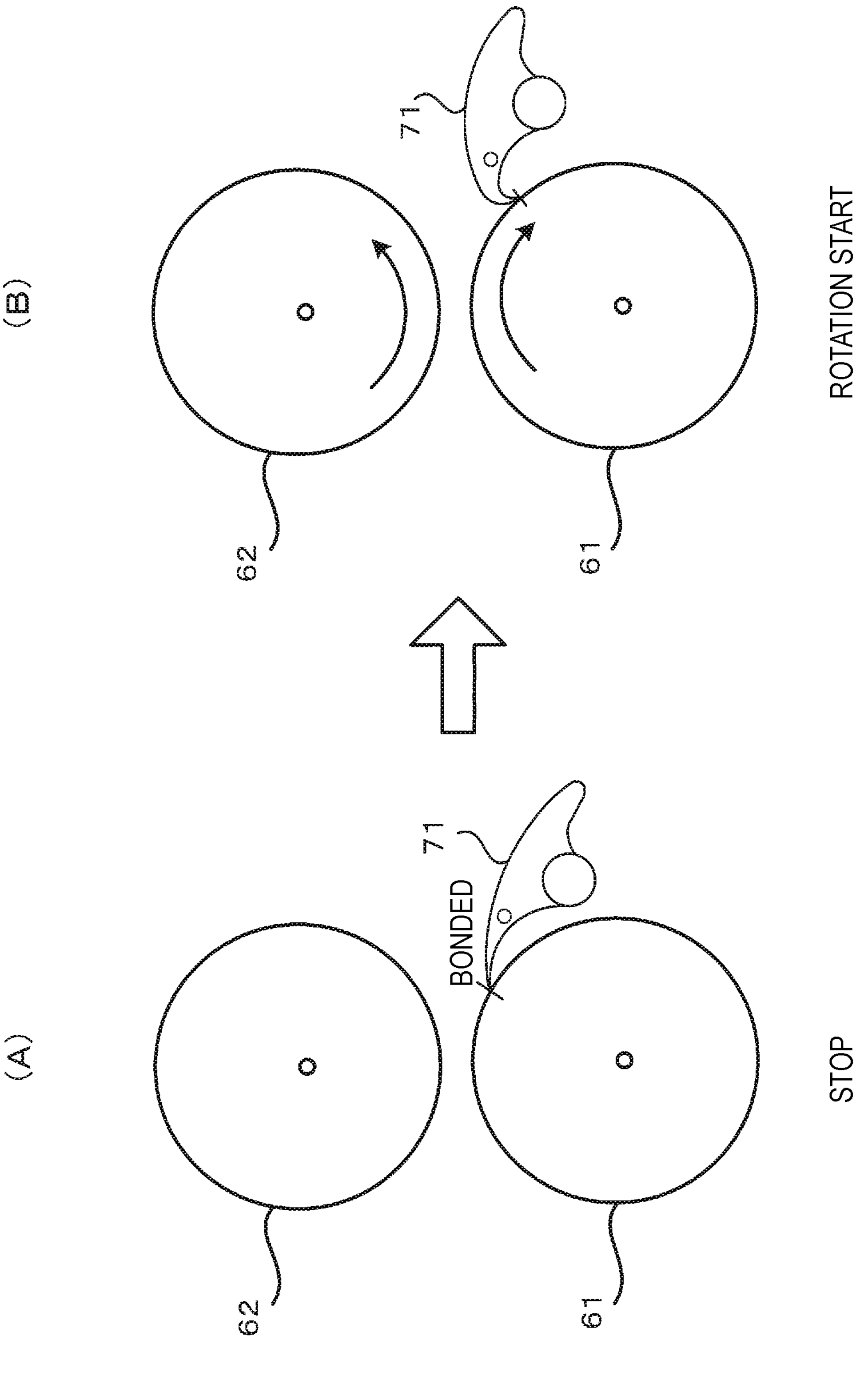
FIG. 18 illustrates a state in which charge eliminating rollers 61, 62 rotate in a forward rotation direction from a stop state.

FIG. 18 illustrates a state in which the charge eliminating rollers 61, 62 rotate in the forward rotation direction from the stop state.

In the charge eliminating apparatus 50 according to the exemplary embodiment, the top end of the movable portion 71 constituting the peeling member 63 is abutted against the charge eliminating roller 61 in a state of being biased in the direction toward the surface of the charge eliminating roller 61. For this reason, when printing is not performed for a long period of time in the image forming system 10, the top end of the movable portion 71 and the surface of the charge eliminating roller 61 continue being in contact with each other. In the charge eliminating apparatus 50, a discharge product such as nitrogen oxide due to corona discharge may be generated.

When the top end of the movable portion 71 continues being in contact with the surface of the charge eliminating roller 61 for a long time in presence of such a discharge product, the top end of the movable portion 71, which is a part of the peeling member 63, may be bonded (or fixed) to the surface of the charge eliminating roller 61 due to the influence of the discharge product.

(A) of FIG. 18 illustrates a state in which the top end of the movable portion 71 is bonded to the surface of the charge eliminating roller 61 in this way. Referring to (A) of FIG. 18, it can be seen that the top end of the movable portion 71 biased by the spring 73 is bonded to the surface of the charge eliminating roller 61. In FIG. 18, to facilitate understanding of the description, a mark is provided in a position on the surface of the charge eliminating roller 61 to which the movable portion 71 is bonded.

(B) of FIG. 18 illustrates a state in which the charge eliminating rollers 61, 62 are rotated in the forward rotation direction in such a state. In (B) of FIG. 18, it can be seen that the top end portion of the movable portion 71 is bent due to the charge eliminating roller 61 rotating in the forward rotation direction in a state where the top end portion of the movable portion 71 is bonded to the surface of the charge eliminating roller 61. When the charge elimination processing is performed in a state in which the top end portion of the movable portion 71 is bent in this way, the peeling member 63 would not function normally and the sheet jam occurs.

Figure 19:
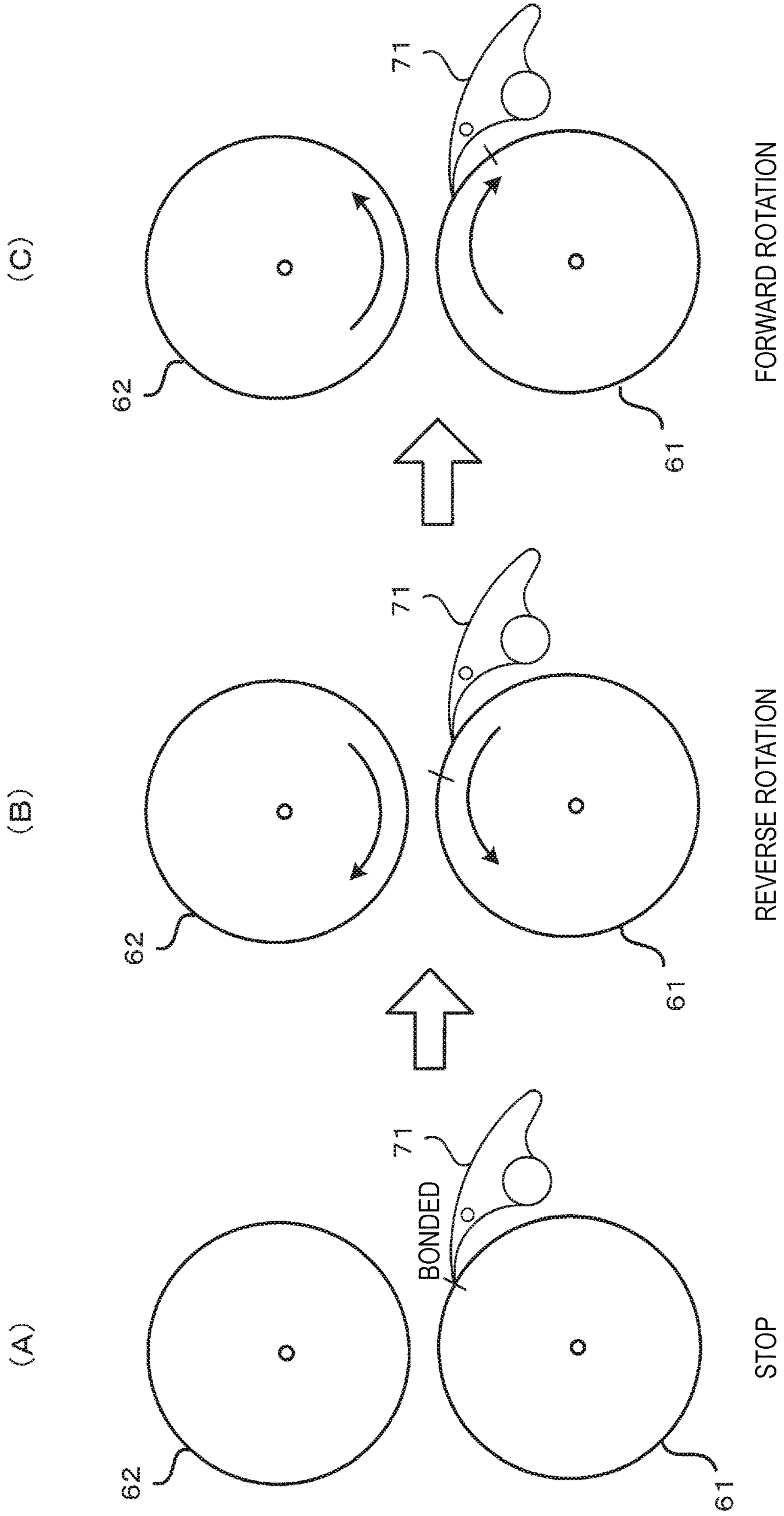
FIG. 19 illustrates rotation control when a controller 56 shifts the charge eliminating rollers 61, 62 from the stop state to a rotation state.

Therefore, in the charge eliminating apparatus 50 according to the present exemplary embodiment, the controller 56 performs rotation control by a method as illustrated in FIG. 19 when the charge eliminating rollers 61, 62 are shifted from the stop state to a rotation state.

First, when the two charge eliminating rollers 61, 62 in the stop state as illustrated in (A) of FIG. 19 are to be rotated, the controller 56 rotates the charge eliminating rollers 61, 62 in the reverse direction opposite to the forward direction as illustrated in (B) of FIG. 19. When doing so, the bonding between the movable portion 71 and the surface of the charge eliminating roller 61 is released. Thereafter, the controller 56 rotates the charge eliminating rollers 61, 62 in the forward rotation direction in which the charge eliminating rollers 61, 62 are originally intended to be rotated. When doing so, as illustrated in (C) FIG. 19, the top end of the movable portion 71 maintains being normally abutted against the surface of the charge eliminating roller 61 without being bent.

In this way, the controller 56 performs control, before rotating the two charge eliminating rollers 61, 62 in the forward rotation direction, to rotate the two charge eliminating rollers 61, 62 in the forward rotation direction after controlling the two charge eliminating rollers 61, 62 to perform the reverse rotation operation of rotating in the reverse rotation direction opposite to the forward rotation direction.

Here, in the charge eliminating roller unit 54 described above, plural peeling members 63 constituted by the movable portion 71 and the support portion 72 are provided, and the peeling members may have other configurations.

Figure 20:
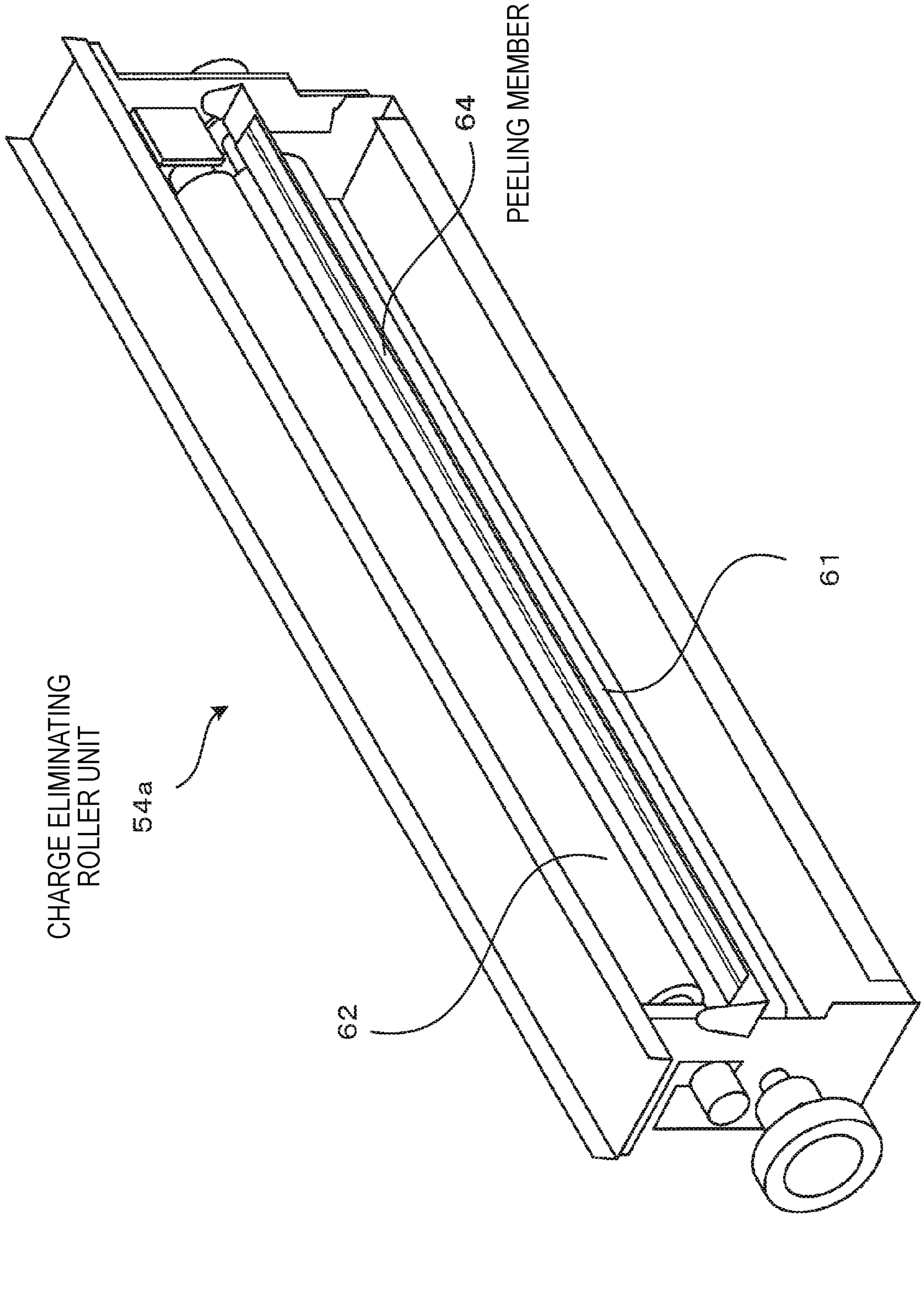
FIG. 20 is a perspective view of a charge eliminating roller unit 54*a* using a plate-shaped peeling member 64.

For example, FIG. 20 illustrates a charge eliminating roller unit 54*a* using one plate-shaped peeling member 64. The peeling member 64 illustrated in FIG. 20 is formed of, for example, a mylar film, and has a top end portion abutted against the surface of the charge eliminating roller 61 similarly to the peeling members 63.

Figure 21:
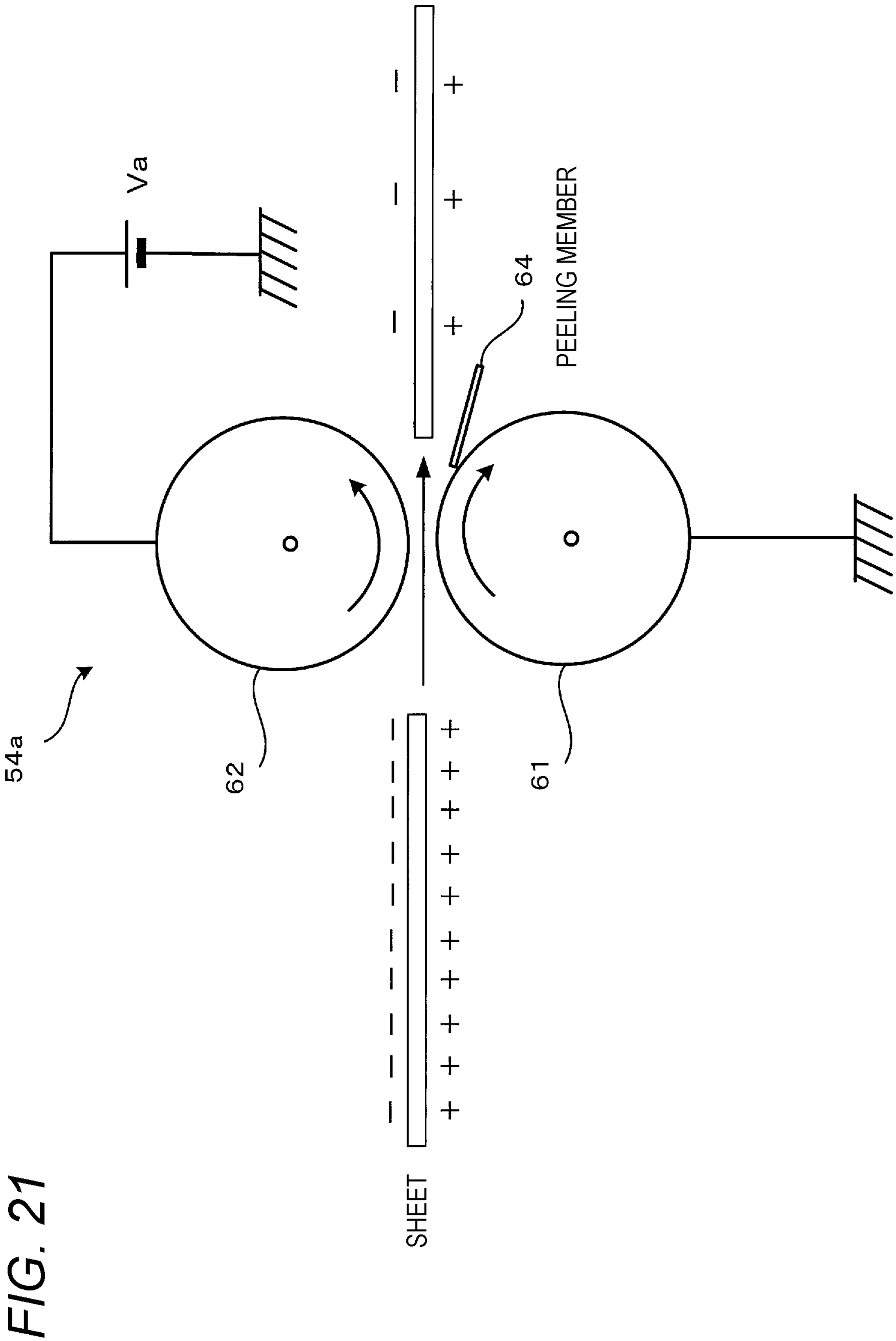
FIG. 21 is a sectional view of the charge eliminating roller unit 54*a* illustrated in FIG. 20.

FIG. 21 is a cross-sectional view of the charge eliminating roller unit 54*a* illustrated in FIG. 20. Referring to FIG. 21, it can be seen that the plate-shaped peeling member 64 is provided to the charge eliminating roller 61 at an angle at which the transported sheet is to be peeled off. Even with such a plate-shaped peeling member 64, similar to the peeling members 63 described above, the sheet attached to the surface of the charge eliminating roller 61 is peeled off.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

[Reference Sign List]

10 image forming system
20 image forming apparatus
30 relay apparatus
40 interposer
50 charge eliminating apparatus
51 to 53 pair of transport roller
54, 54*a* charge eliminating roller unit
55 non-contact charge eliminating unit
56 controller
57 guide plate
60 inspection apparatus
61, 62 charge eliminating roller
63 peeling member
64 peeling member
70 stacker
70 stacker
71 movable portion
72 support portion
73 spring
80 post-processing apparatus

What is claimed is:

1. An image forming system comprising:

an image forming apparatus configured to form an image on a recording medium;

a post-processing apparatus configured to perform first post-processing on the recording medium on which the image is formed by the image forming apparatus;

a relay apparatus having a function of changing a transport speed of the recording medium on which the image is formed by the image forming apparatus to a transport speed of the recording medium in the post-processing apparatus and transporting the recording medium to a subsequent stage; and a charge eliminating apparatus configured to perform charge elimination on the recording medium that is charged, by reducing a charge amount of the charged recording medium, wherein the charge eliminating apparatus is positioned after the relay apparatus and before the post-processing apparatus in a processing direction.

2. The image forming system according to claim 1, wherein the relay apparatus has a function of performing second post-processing on the recording medium on which the image is formed by the image forming apparatus.

3. The image forming system according to claim 2, wherein the function of performing the second post-processing performed by the relay apparatus comprises at least one of a function of cooling the recording medium, a curl correction function, a slipsheet insertion function, an image density reading function, and a punching function.

4. The image forming system according to claim 1, wherein the relay apparatus has a transport path longer than the recording medium in a transport direction.

5. The image forming system according to claim 1, wherein the post-processing apparatus has at least one or of a function of a creasing function, a cutting function, a bookbinding function, a binding function, a stacking function, an alignment function, a punching function and a sheet discharge function for the recording medium on which the image is formed by the image forming apparatus.

6. The image forming system according to claim 1, further comprising:

a slipsheet insertion apparatus configured to insert a set slipsheet in a middle of a transport path, wherein the charge eliminating apparatus is provided at a stage after the slipsheet insertion apparatus.

7. The image forming system according to claim 1, further comprising:

an inspection apparatus configured to inspect whether the image is normally formed on the recording medium, wherein the charge eliminating apparatus is provided at a stage before the inspection apparatus.

8. The image forming system according to claim 1, wherein the charge eliminating apparatus is configured to be connected, relative to the processing direction, immediately after a sheet feeding apparatus, immediately before a discharge apparatus, immediately before the post-processing apparatus, or immediately after the post-processing apparatus.

9. The image forming system according to claim 1, wherein the charge eliminating apparatus comprises:

two charge eliminating rollers to which voltages of different potentials are applied respectively, the two charge eliminating rollers configured to perform the charge elimination by reducing a charge amount of the recording medium when the recording medium passes through the two charge eliminating rollers, and a peeling member abutted against a surface of one of the two charge eliminating rollers, the peeling member being configured to peel off the recording medium adhering to the one of the two charge eliminating rollers with rotation of the one of the two charge eliminating rollers.

10. A charge eliminating apparatus comprising:

two charge eliminating rollers to which voltages of different potentials are applied respectively, the two charge eliminating rollers performing charge elimination by reducing a charge amount of a recording medium when the recording medium passes through the two charge eliminating rollers; and a peeling member abutted against a surface of only one of the two charge eliminating rollers, the other of the two charge eliminating rollers having no peeling member abutted thereagainst, the peeling member being configured to peel off the recording medium adhering to the one of the two charge eliminating rollers with rotation of the one of the two charge eliminating rollers, wherein:

the two charge eliminating rollers are respectively provided on lower and upper sides of the charge eliminating apparatus in a vertical direction, and the peeling member is abutted against only the one of the two charge eliminating rollers which is provided on a non-power supply side in the vertical direction and is grounded.

11. The charge eliminating apparatus according to claim 10, wherein a top end of the peeling member is abutted against a downstream surface of the one of the two charge eliminating rollers in a forward rotation direction at an acute angle.

12. The charge eliminating apparatus according to claim 10, wherein the peeling member is positioned where the peeling member peels off the recording medium adhering to the surface of the one of the charge eliminating rollers with the rotation of the one of the charge eliminating rollers.

13. The charge eliminating apparatus according to claim 10, wherein the peeling member is provided at a plurality of positions in a width direction of a transport path through which the recording medium is transported.

14. The charge eliminating apparatus according to claim 10, wherein the peeling member is abutted against the surface of the one of the charge eliminating rollers by being biased in a direction toward the surface of the one of the charge eliminating rollers by an elastic member.

15. The charge eliminating apparatus according to claim 10, further comprising:

a controller configured to control rotation of the two charge eliminating rollers, wherein the controller controls, before controlling the two charge eliminating rollers to perform a forward rotation operation of rotating in a forward rotation direction in which the recording medium passes through between the two charge eliminating rollers and is transported to a subsequent stage, the one of the charge eliminating rollers provided with the peeling member to perform reverse rotation operation of rotating in a reverse rotation direction opposite to the forward rotation direction.

16. The charge eliminating apparatus according to claim 15, wherein the controller is configured to control the one of the charge eliminating rollers to perform the reverse rotation operation at both a start of printing processing on the recording medium and after the printing processing on the recording medium based on a printing instruction.

17. The charge eliminating apparatus according to claim 15, wherein the controller is configured to control the one of the charge eliminating rollers to stop after the reverse rotation operation and to perform the forward rotation operation after the stop.

18. The charge eliminating apparatus according to claim 15, wherein in response to the one of the charge eliminating rollers performing the forward rotation operation after the reverse rotation operation, the controller is configured to perform control to gradually increase a rotation speed of the one of the charge eliminating rollers during the forward rotation operation until steady rotation.

19. A charge eliminating apparatus comprising:

two charge eliminating rollers to which voltages of different potentials are applied respectively, the two charge eliminating rollers performing charge elimination by reducing a charge amount of a recording medium when the recording medium passes through the two charge eliminating rollers;

a peeling member abutted against a surface of one of the two charge eliminating rollers, the peeling member being configured to peel off the recording medium adhering to the one of the two charge eliminating rollers with rotation of the one of the two charge eliminating rollers; and a controller configured to control rotation of the two charge eliminating rollers, wherein the controller controls, before controlling the two charge eliminating rollers to perform a forward rotation operation of rotating in a forward rotation direction in which the recording medium passes through between the two charge eliminating rollers and is transported to a subsequent stage, the one of the charge eliminating rollers provided with the peeling member to perform reverse rotation operation of rotating in a reverse rotation direction opposite to the forward rotation direction.

* * * * *